(12) United States Patent
Dongare et al.

(10) Patent No.: US 12,259,487 B2
(45) Date of Patent: Mar. 25, 2025

(54) TECHNIQUES FOR LOCALIZING AN ELECTRONIC DEVICE

(71) Applicant: APPLE INC., Cupertino, CA (US)

(72) Inventors: Adwait N. Dongare, Pittsburgh, PA (US); Robert W. Brumley, San Jose, CA (US); Robert Golshan, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 371 days.

(21) Appl. No.: 17/397,676

(22) Filed: Aug. 9, 2021

(65) Prior Publication Data

US 2022/0317236 A1 Oct. 6, 2022

Related U.S. Application Data

(60) Provisional application No. 63/168,663, filed on Mar. 31, 2021.

(51) Int. Cl.
*G01S 5/02* (2010.01)
(52) U.S. Cl.
CPC ........ *G01S 5/0284* (2013.01); *G01S 5/02216* (2020.05); *G01S 5/0273* (2013.01)
(58) Field of Classification Search
CPC .. G01S 5/0284; G01S 5/02216; G01S 5/0273; G01S 1/045; G01S 5/0236; G01S 5/14; G01S 1/024
See application file for complete search history.

(56) References Cited

U.S. PATENT DOCUMENTS 6,275,705 B1 8/2001 Drane et al.
8,996,302 B2 * 3/2015 Marti ................ G01C 21/3896
701/434

(Continued)

FOREIGN PATENT DOCUMENTS

EP 2420855 A1 2/2012
JP 2017223645 A 12/2017

(Continued)

OTHER PUBLICATIONS

International Search Report and Written Opinion issued in PCT Application No. PCT/US2022/018532, dated Jul. 14, 2022 in 11 pages.

(Continued)

*Primary Examiner* — Kabir A Timory
(74) *Attorney, Agent, or Firm* — Kilpatrick Townsend & Stockton LLP

(57) ABSTRACT

An electronic device may receive a first signal from a first transmitting device at a first time. The electronic device may receive a second signal from a second transmitting device at a second time. The electronic device may access location information for the first transmitting device and the second transmitting device. The electronic device may receive a message from a second electronic device having a known distance relationship to the first transmitting device and the second transmitting device, wherein the second electronic device is configured to receive the first signal, the second signal, and the message including timing information of the signals. The electronic device may determine the position of the electronic device using the location information and the timing information, wherein the position is dependent on the known distance relationship.

18 Claims, 10 Drawing Sheets

(56) References Cited

U.S. PATENT DOCUMENTS

| 9,386,414 | B1* | 7/2016 | Mayor | G01S 19/17 |
|---|---|---|---|---|
| 2023/0188980 | A1* | 6/2023 | Lee | H04W 4/029 |
| | | | | 726/2 |

FOREIGN PATENT DOCUMENTS

| JP | 2019516982 A | 6/2019 |
|---|---|---|
| WO | 2012022756 A1 | 2/2012 |

OTHER PUBLICATIONS

International Preliminary Report on Patentability issued in PCT Application No. PCT/US2022/018532, dated Oct. 12, 2023 in 8 pages.
Office Action issued in Japan Application No. JP2023-556569, dated Jul. 8, 2024 in 8 pages.
Office Action issued in Japan Application No. JP2023-556569, dated Nov. 29, 2024 in 4 pages.

\* cited by examiner

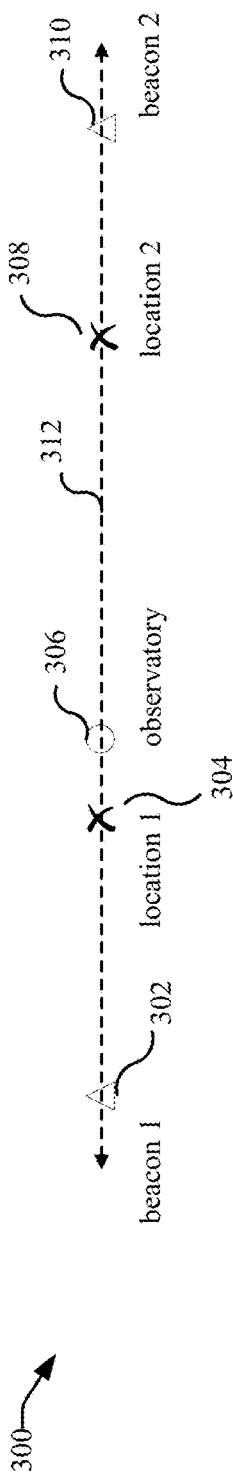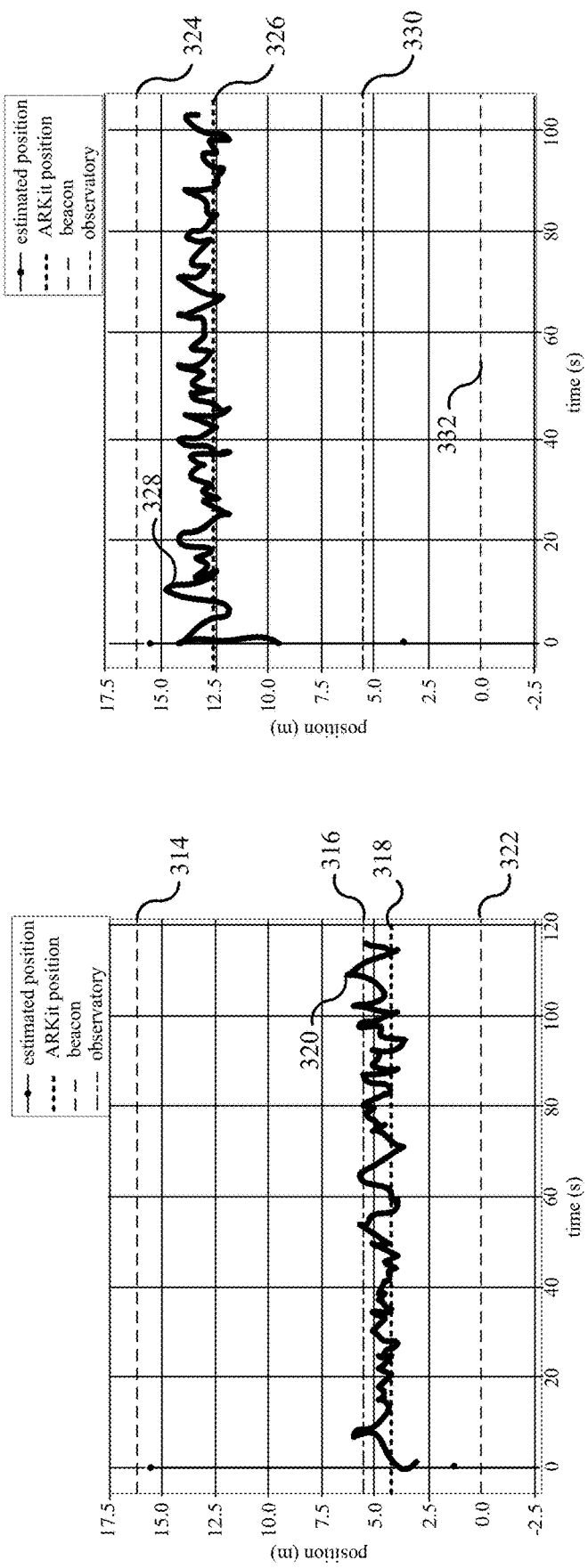
FIG. 3A
FIG. 3B
FIG. 3C

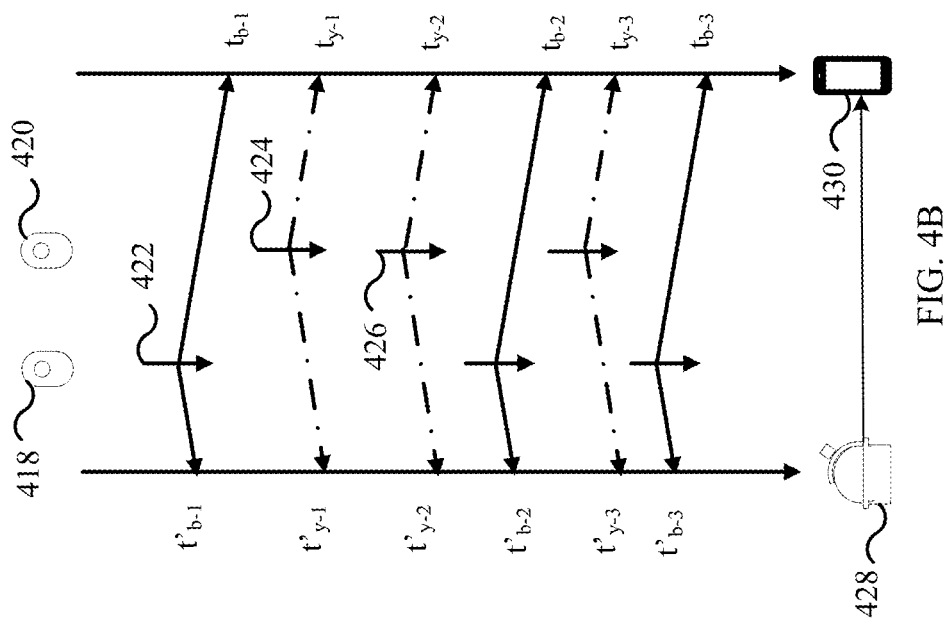
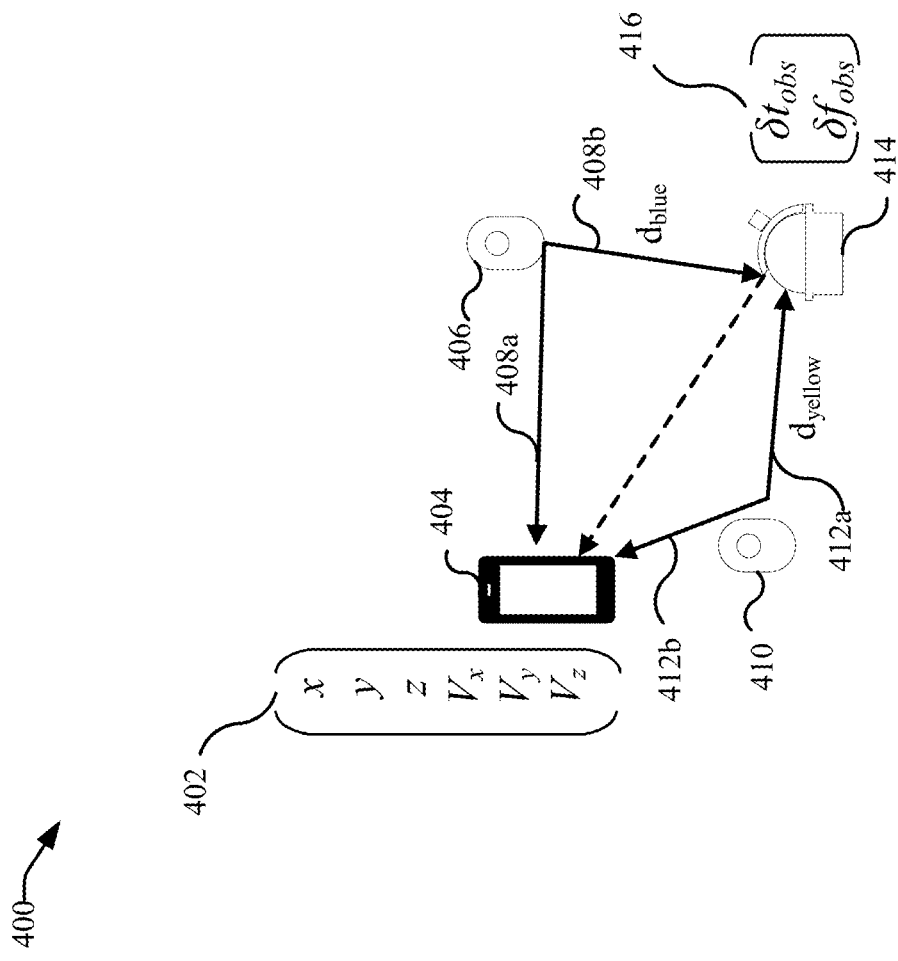
FIG. 4B
FIG. 4A

TECHNIQUES FOR LOCALIZING AN ELECTRONIC DEVICE

CROSS REFERENCE TO RELATED APPLICATIONS

This application claims priority to U.S. Provisional Application No. 63/168,663, filed on Mar. 31, 2021 the disclosure of which is hereby incorporated by reference herein in its entirety.

BACKGROUND

Localization schemes allow for device positioning and tracking through capture of precision timing signals. A localization scheme can use, at a minimum, a beacon to transmit the signal and a device to receive the signal. However, many localization schemes, such as asynchronous beaconing, time difference of arrival, or point-to-point ranging, require active beacons that both transmit and receive signals. Compared to passive beacons, that only transmit signals, active beacons are less energy efficient because of the calculations involved in receiving and analyzing signals. Additionally, while a single beacon can transmit a signal to a large number of devices, there is a limit to how many return signals an individual beacon can receive and process. Accordingly localization schemes involving two-way beacons are not energy efficient or easily scalable.

Further, customers are sensitive to privacy concerns and many localization schemes, particularly ones requiring the tracked device to transmit a signal, can create a device location record. Customers are often concerned about both corporations tracking their movements and unauthorized persons acquiring their location data. However, while a transmission scheme where beacons transmit signals (e.g., time of arrival) may be more scalable, synchronization is required with the beacon, again requiring receiving and transmitting signals. Accordingly, it is desirable to develop a scalable, accurate, and low power localization scheme that protects user privacy and is resistant to interference.

BRIEF SUMMARY

Embodiments provide a time of arrival localization scheme that can be both scalable (many devices can receive a signal from a single beacon) and can protect user privacy (a device does not transmit any identifiable information including its location). Embodiments can avoid a direct timing synchronization between the beacons and a device by using a separate electronic device (observatory) whose distance to the beacons is known. In this manner, the beacons do not need to receive timing signals from the devices. As the beacons may only transmit signals (or at least only transmit infrequently), they can be inexpensive and energy efficient battery powered beacons.

Such an observatory device, which may be connected to a power source, receives the transmitted signals and forwards timing information to the device whose location is to be determined. Since the distance from the observatory to the beacons is known, the device can determine its location, e.g., using a reconstructed transmission time from the beacons using the reception time at the observatory and the known distance. Other implementations can determine the location in a different manner, e.g., as described herein.

Additionally, error from clock speed fluctuations can be mitigated by transmitting beacon signals frequently. If the observatory is able to receive all signals required for the calculation within a sufficiently small window, the clock variance can be sufficiently small to allow for accurate location calculations. By using a time of arrival localization scheme, devices can be tracked through an energy efficient and scalable process that protects user privacy.

Other embodiments of the invention are directed to systems, apparatus, and computer readable media associated with methods described herein. In one embodiment, the computer readable medium contains instructions for receiving data and analyzing data, but not instructions for directing a machine to create the data (e.g. sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

FIG. 3A illustrates an exemplary use case of the time of arrival localization technique for tracking an electronic device in a sequential queue.

FIG. 3B shows an exemplary graph charting an electronic device's estimated position.

FIG. 3C shows an exemplary graph charting an electronic device's estimated position.

FIG. 4A illustrates an exemplary localization technique using a single observatory and two transmitting devices.

FIG. 4B illustrates an exemplary localization technique using a single observatory and two transmitting devices.

Like reference, symbols in the various drawings indicate like elements, in accordance with certain example implementations. In addition, multiple instances of an element may be indicated by following a first number for the element with a letter or a hyphen and a second number.

DETAILED DESCRIPTION

Certain embodiments are directed to techniques (e.g., a device, a method, a memory or non-transitory computer readable medium storing code or instructions executable by one or more processors) for communication techniques, e.g., using transmitting devices such as beacons installed at a location.

Mobile devices can be localized using techniques that use a network of transmitting devices (e.g., beacons). In general, these localization techniques can involve determining the transmission time and the arrival (reception) time of signals sent from the transmitting devices to the mobile device. The distance between a transmitting device and a mobile device can be calculated by dividing the signal's travel time (difference in transmission and arrival times) by the signal's speed. In order to increase location accuracy, localization techniques can reduce timing errors. Generally, timing can be improved by synchronizing the clocks of the transmitting devices and the clock of the mobile device, so that the signal's travel time is accurate. However, synchronization accuracy with the beacons typically requires complicated transmission techniques and devices using two-way communications and precise clocks, which can cause scalability and cost issues for the beacons.

A brief review of localization techniques below is followed by further details of embodiment of the present disclosure.

I. Localization Techniques

Figure 1:
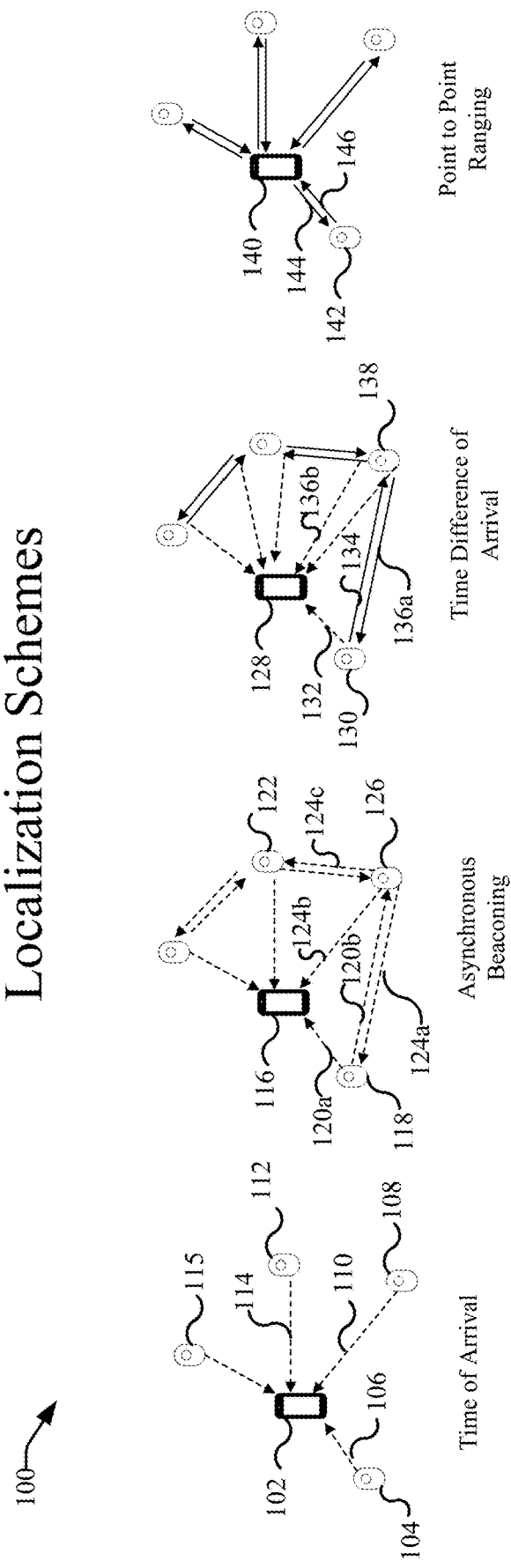
FIG. 1 illustrates several exemplary localization schemes.

FIG. 1 shows several exemplary localization schemes 100 that use transmitting devices to localize an electronic device. Such techniques can include one or more transmitting devices 104 (e.g., beacons) configured to emit a signal. Such signals can be an acoustic or electromagnetic wave 106 and can be formed using ultra-wideband (UWB) radio technology.

A. Time of Arrival

An electronic device 102 (e.g., a mobile device, a smart phone, a tablet computer, a wearable device or a laptop computer) is shown as part of a time of arrival localization scheme. Time of arrival (TOA) localization involves precisely timing the arrival of signals sent from transmitting devices 104, 108, 112, 115 to an electronic device 102. For example, a transmitting device 104 emits an acoustic or an electromagnetic wave 106 that is received by an electronic device 102. The transmitting device 104 can be battery powered, connected to an electrical power source, or powered by a renewable source such as a built in solar cells. Each transmitting device 104, 108, 112, 115 can have a known position and this known position can be used with the timing information to calculate the electronic device location. The acoustic or electromagnetic wave 106 can be sound waves, light waves, radio waves or any other wave that propagates at a known speed. The distance between a transmitting device 104 and the electronic device 102 can be calculated by measuring the time the signal 106 leaves the transmitting device 104 and the time the signal 106 arrives at the electronic device 102. The signal 106 can include a message with a time stamp indicating the transmission time in order to determine the travel time and thus range to the electronic device 102. In order for such a scheme to be precise, the clock of the transmitting device 104 must be synchronized with the clock of the electronic device 102. Even a fraction of a second difference can result in an inaccurate range determination. In various embodiments, other wireless signals (e.g., Bluetooth Low Energy advertising signals) can be used to synchronize the various devices and to inform the electronic device 102 of a time the signal 106 will be transmitted.

Once the transmitting and arrival times are received and recorded at the electronic device 102, the distance between the electronic device 102 and the transmitting device 104 can determined by multiplying the signals' travel time by the signal's propagation speed. For example, for electromagnetic waves the distance can be equal to the elapsed time multiplied by the speed of light.

While the electronic device's distance from a transmitting device 104 can be calculated with a single transmitting device, multiple transmitting devices 108, 112, 115 can be used to determine an electronic device's position. A two-dimensional position can be determined using a minimum of two transmitting devices. By using a second transmitting device 108 and a second signal 110, the electronic device's position, along an axis between the two transmitting devices, can be calculated by determining the electronic device's distance from each transmitting device 104, 108, 112, 115. A three-dimensional position can be determined using a minimum of three transmitting devices 104, 108, 112, 115. Accordingly, with a third transmitting device 112 and a third signal 114, the electronic device's location on a Cartesian plane or other graph can be determined using the electronic device's distance from each of the transmitting devices.

B. Alternative Localization Techniques

Alternative localization schemes are also shown on FIG. 1 including asynchronous beaconing, time difference of arrival and point to point ranging. These alternative localization schemes generally require more sophisticated transmitting devices that are less energy efficient than the devices in a time of arrival localization scheme. These localization techniques generally require synchronization between the transmitting devices' clocks. Synchronization may be difficult to achieve across a network of transmitting devices because of the precise timing required for accurate localization. Because the times used in calculations may be extremely precise, natural fluctuations in clock frequency that may be due to thermal noise, phonon scattering, electromagnetic noise, or mechanical vibration can desynchronize the transmitting devices' clocks. While these errors may be small, when precise timing is required, small errors in timing can result in inaccurate location calculations. Eliminating the need to synchronize transmitting devices may reduce location errors and may result in a more accurate localization scheme. Additionally, the precise clocks that may be needed for these localization techniques may be energy inefficient. Synchronization also may involve periodic signals between the transmitting devices to ensure the clocks are coordinated. Receiving signals sent by other transmitting devices may require additional components and calculations and this may result in more expensive transmitting devices that may not be able to operate on battery power.

Asynchronous beaconing is an alternative localization scheme that is similar to time of arrival except that the transmitting devices 118, 126 do not have synchronized clocks. Like for time of arrival, a first transmission device 118 can emit a signal 120a that is detected by the electronic device 116 and can be used to determine the distance between the electronic device and the transmission device. However the signal 120b can also propagate towards, and can be detected by, a second transmission device 126. The second transmission device 126 can emit a signal 124 in response to the signal 120b from the first transmission device 118. The signal 120 can propagate towards the electronic device 116 and the first transmission device 118 and a third transmission device 122 until all transmitting devices have generated a signal and the electronic device 116 can calculate the device's location. Accordingly, the transmitting devices in an asynchronous beaconing scheme must both send and receive signals.

Time difference of arrival (TDOA) involves calculating the location of an electronic device 128 by measuring the difference between the time a signal 132 sent by a transmission device 130 arrives at the electronic device and the time a signal 136b sent by a second transmission device 138 arrives at the electronic device 128. A difference between TDOA and TOA is that TOA does not require synchronization between transmitting devices. TDOA transmitting devices exchange signals 134 and 136a to ensure that the two device's clocks are synchronized and transmissions are broadcast at the same time. Accordingly, transmitting devices configured for TDOA localization may include higher quality clocks and receivers which can make the transmitting devices less energy efficient than transmitting devices configured for TOA localization.

Point to point ranging is a localization scheme that may be desirable when the clock in transmission device 142 cannot be synchronized with the clock in other transmitting devices. A signal 144 can be sent from the electronic device 140 to the transmission device 142. When the signal is received by the transmission device, a return signal 146 is broadcast by the transmission device and received by the electronic device. The return signal includes the delay between the detection of the first signal 144 at the transmission device and the broadcast of the return signal 146 from the transmission device to the electronic device. The time a signal takes to travel between the transmission device 142 and the electronic device 140 can be determined by taking the time between the transmission of signal 144 and the receipt of signal 146, subtracting the delay from this sum, and dividing the remaining sum in half. Accordingly, the electronic device can determine the distance between the electronic device and the transmission device by multiplying the signal's propagation speed by the time-calculated sum. These techniques can be difficult to be done at scale, such as with hundreds or even thousands of devices using the information of the transmitting devices for localization of the electronic device.

II. Time of Arrival Localization without Synchronization

In various embodiments, the time of arrival localization techniques described herein can be used to determine an electronic device's location based on signals from two or more transmitting devices. Such techniques can be energy efficient, provide scalability, and avoid security concerns.

The time of arrival techniques described herein can allow a large number of users to determine their precise location (e.g., at a large venue) using low power asynchronous transmitting devices. Because the transmitting devices may only send signals to accomplish the localization, the localization technique's scalability is not limited by the number of signals each transmission device can receive and process. Further, because some transmitting devices may not need to be configured to receive and process signals, the transmitting devices can be cheaper and more energy efficient than the devices used in other localization techniques.

Embodiments can achieve such advantages by using a separate device (e.g., separate from the beacons) that can provide the timing information from multiple beacons. This separate device can have a known distance to the beacons and act as an observatory of the signals. Since the observatory has a known distance to the beacons, the arrival time of the beacon signals at the observatory along with the known distance can be used to determine the transmission time of the beacon signals, thereby allowing localization without requiring such functionality in the beacons. Given that one observatory can service multiple beacons, efficiencies (e.g., cost, scalability, etc.) can be achieved even when the observatory performs some synchronization with the mobile devices. The precise time clock in the observatory and a precise time clock in the electronic device can be used to ensure that the electronic device and the observatory are synchronized in time within a certain threshold for accurate measurements.

Figure 2:
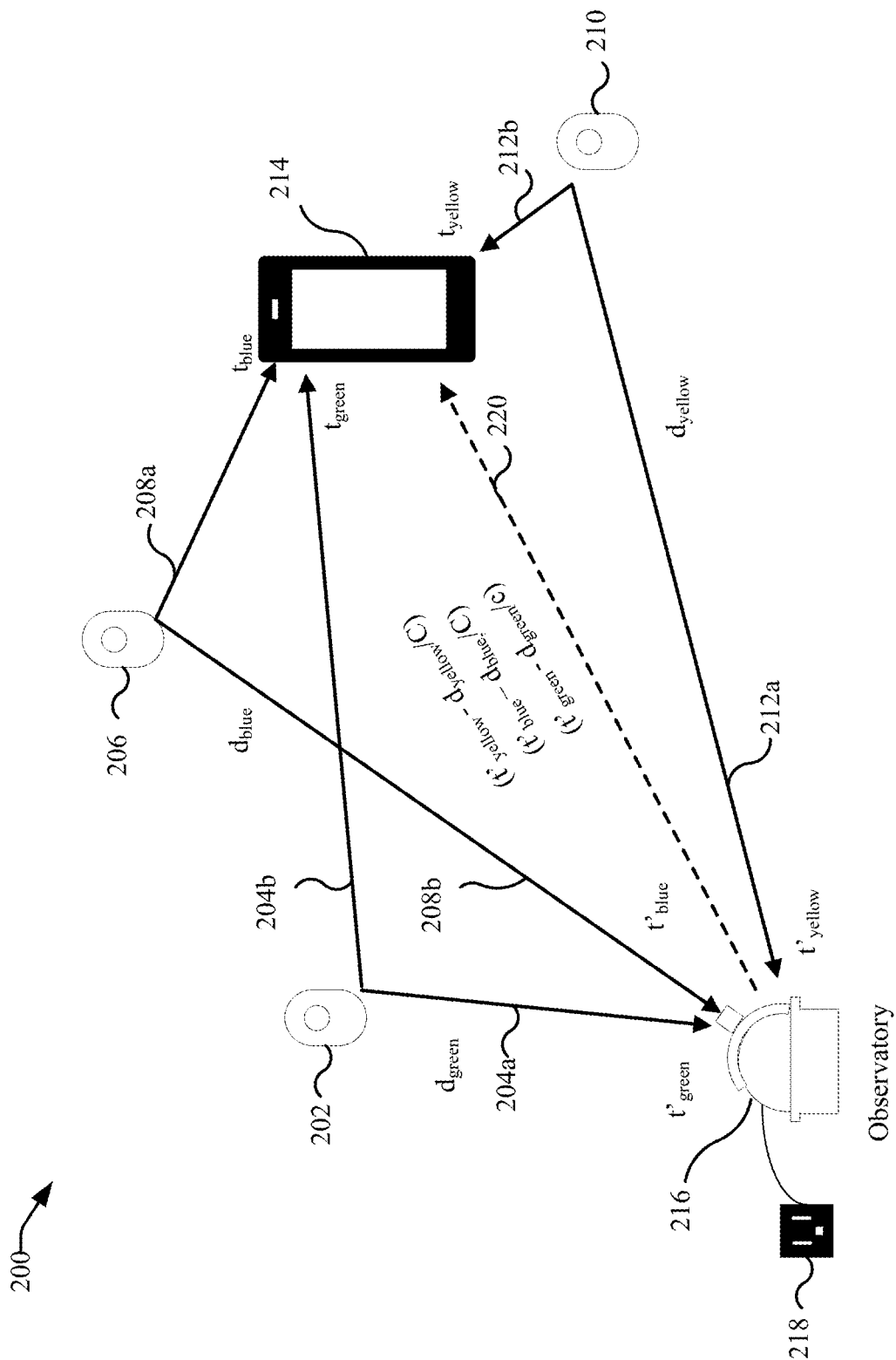
FIG. 2 illustrates an exemplary localization technique using a single observatory and three transmitting devices.

FIG. 2 illustrates a localization technique 200 using a single observatory 216 and three transmitting devices 202, 206, 210. The three transmitting devices 202, 206, 210 can be used to determine a location of the electronic device 214. Although FIG. 2 shows three transmitting devices, other numbers of transmitting devices can be used. The location can be a two-dimensional or three-dimensional location as previously discussed above. A first transmitting device 202, 206, 210 may transmit a signal 204 that is received by both the electronic device 214 and the observatory 216.

An observatory 216 can be an electronic device that includes one or more processors, a receiver (e.g., a UWB receiver), and a memory. In various embodiments, the observatory 216 can transmit signals and can conduct two-way communications with various devices. In various embodiments, the observatory 216 can determine a range (distance) to each of one or more transmitting devices (e.g., a first transmitting device 202, a second transmitting device 206, and a third transmitting device 210).

The range between each of the transmitting devices 202, 206, 210 and the observatory 216 can be determined using a variety of methods. In some embodiments the range between each of the transmitting devices 202, 206, 210 and the observatory 216 is uploaded to the memory of the observatory, either directly to the observatory 216 or via a remote device that sends the information to the observatory 216 or an electronic device 214 over a network.

In some embodiments, the transmitting devices 202, 206, 210 or the observatory 216 can be configured to periodically determine the range between the transmitting devices 202, 206, 210 and the observatory 216 using any of the techniques described above in section I. The observatory 216 can include a precise timing device (e.g., a GNSS-based clock) that enables more precise time measurements. And since there may be only one observatory for many (e.g., 3-20) beacons, the cost of such a precise timing device is not excessive. As examples, the observatory 216 can be powered by battery, renewable power, or a local power source 218.

Each of the first transmitting device 202, the second transmitting device 206, and the third transmitting device 210 can transmit signals 204, 208, and 212 that can be received by both the electronic device 214 and the observatory 216. Both the observatory 216 and the electronic device 214 may record the time each signal 204, 208, 212 is received by the receiver. The times cab be recorded in a memory of the observatory 216 and the electronic device 214 respectively. The transmitting devices 202, 206, 210 can operate asynchronously and, because the electronic device 214 or observatory 216 can record the timing information, the transmitting devices 202, 206, 210 do not need to record and send a time when each of the signals 204, 208, 212 are transmitted. The observatory 216 can determine timing information for each of the transmitting devices 202, 206, and 210.

The timing information can include the transmission times for the signals from each of the transmitting devices 202, 206, 210. The transmission times can be determined using the following equation:

$$t_1 = t' - \text{range}/c.$$

where $t_1$ is the transmitting time, t' is the reception time and c is the speed of light.

The transmission time ($t_1$) can be determined by receiving a signal 204, 208, 212 from a transmitting device 202, 206, 210 a known range from the observatory 216. The time of reception of the signal can be received at the receiver of the observatory 216 and can be stored in a memory of the observatory 216. The time of reception can be measured using a precise clock of the observatory 216. In general, in order to determine a precise position accurately, the system requires an accurate clock, in some cases accurate to within a few nanoseconds. A reception time (t') can be recorded for each one of a plurality of transmitted signals 204, 208, 212. In some embodiments, each of the plurality of transmitted signals 204, 208, 212 can be identified by an identifier for the transmitter device 202, 206, 210 as part of the signal 204, 208, 212. In some examples, the observatory 216 can determine which transmitting device sent the signal 204, 208, 212 via an identifying characteristic of the signal or a sequencing of the signal 204, 208, 212. If the observatory 216 is at a known range from a transmitting device 202, 206, 210, the observatory 216 can determine the transmission time ($t_1$) using the following formula:

Reception time ($t_2$)–Transmission time ($t_1$)=range/speed of propagation.

As shown in FIG. 2 the range to one or more of the transmitting devices 202, 206, 210 is illustrated as $d_{green}$, $d_{blue}$, and $d_{yellow}$. The one or more reception times (e.g., $t'_{green}$ $t'_{blue}$, and $t'_{yellow}$) of the signals from the one or more transmitting devices 202, 206, 210 can be noted by the receiver/transceiver of the observatory 216 and stored in a memory of the observatory 216.

Because the transmitting devices 202, 206, 210 are not required to record/send timing information, the transmitting devices 202, 206, 210 do not require precise clocks or if they have precise close they do not require that the precise clocks are continuously running. Additionally, the transmitting devices 202, 206, 210 can conserve power because the devices do not have to run continuously to maintain synchronized clocks. Instead, each transmitting device 202, 206, 210 can remain in a low power mode and the device can periodically power on to transmit a signal.

Further, while the electronic device 214 can have a precise clock running while its location is being determined, the electronic device 214 does not need to have its precise clock running continuously. The electronic device's clock only needs to run long enough to receive a signal from enough transmitting devices 202, 206, 210 to make a location calculation. When the electronic device 214 is not actively determining its location, or after it has received a signal from a sufficient number of transmitting devices 202, 206, 210, the precision clock can be powered off. Precise clocks can consume a lot of power, and allowing the electronic device 214 to run its clock for only short periods of time makes the localization process more energy efficient.

The observatory 216 can calculate timing information. The timing information can include the transmission times ($t_1$) for each of the signals 204, 208, 212 from the transmitting devices 202, 206, 210.

In some embodiments, the timing information can include both the range (distance) from the observatory 216 to each of the transmitting devices 202, 206, 210 and the reception time for each of the signals 204, 208, 212 at the observatory 216.

Periodically, the timing information from the observatory 216 may be sent to the electronic device 214. The timing information may be sent via Bluetooth, Wi-Fi, UWB, or any radio wave either directly from the observatory 216 to the electronic device 214 or indirectly through another device or over the a network (e.g., the Internet).

The observatory 216 may transmit this timing information to the electronic device 214 through a signal 220. Once the electronic device 214 receives the timing information, it may determine its location using the timing information, stored information regarding a precise location of the transmitting devices 202, 206, 210, and the received signals from the transmitting devices ($t_{green}$, $t_{blue}$, and $t_{yellow}$). In various embodiments, the electronic device 214 can use the timing information including transmission times ($t_1$) for each of the signals 204, 208, 212 from the transmitting devices 202, 206, 210. The electronic device 214 can determine an elapsed time multiplied by the speed of light to calculate a range (distance) to each of the transmitting devices 202, 206, 210. The elapsed time can be calculated by subtracting the reception time of the signals 204, 208, 212 at the electronic device 214 from the transmission time of the signals 204, 208, 212. The elapsed time can be measured in seconds or fractions of a second. After the range (distance) from the electronic device 214 to each of the transmitting devices 202, 206, 210 is determined, the electronic device 214 can map the ranges to a location of the transmitting devices 202, 206, 210 in a room using an application.

For example, the electronic device 214 can access the stored information regarding a precise location of the transmitting devices 202, 206, 210 and map the transmitting devices into two-dimensional or three-dimensional coordinates for a location. The electronic device 214 can determine a range from each one of the one or more transmitting devices 202, 206, 210 by determining a time difference between the reception time at the electronic device 214 and the transmission time from the timing information received from the observatory 216. The range can be determined by multiplying the time difference by the speed of light. After the range is determined to each of the transmitting devices 202, 206, 210, the range information can be mapped to the coordinates of the location to determine a precise location of the electronic device 214 at the location.

The stored information regarding the precise location of the transmitting devices 202, 206, 210 can be received from an application. For example, a user can download one or more room templates that map out the position of the one or more transmitting devices and/or observatory 216 that can be used to precisely determine a position an electronic device 214 within the room at the location. For example, a store can allow users to download an application for the store layout which provides the precise information of the location of the one or more transmitting devices to the electronic device 214. The location of the one or more transmitting devices may not be illustrated on a display. Alternatively, the electronic device 214 can transmit the timing information of the signals it received from the transmitting devices 202, 206, 210 to the observatory 216. The observatory 216 may calculate the electronic device's location and transmit the location information to the electronic device 214.

Because the transmitting devices 202, 206, 210 only send signals, the signals from the transmitting devices 202, 206, 210 can be received by many electronic devices 214 simultaneously without any of the limitations associated by two-way ranging processes. Conversely, localization schemes where the transmitting device 202, 206, 210 receives a signal from an electronic device 214 are limited by the number of signals each transmitting device 202, 206, 210 can receive and process. By using transmitting devices 202, 206, 210 that only send signals, embodiments described herein can be scaled provide location information to as many electronic devices 214 as can receive the signals 204, 208, 212.

In some embodiments the time of arrival localization technique may include more than three transmitting devices. More than three transmitting devices may allow the time of arrival localization technique to be implemented in a large space that could not be effectively covered with a smaller number of transmitting devices. Alternatively, more than three transmitting devices can allow one or more beacons to be taken offline for either charging or maintenance without interrupting electronic device tracking. When using more than three beacons, three beacons can be selected for the localization calculations bases on the devices signal strength or proximity. Because the transmitting devices 202, 206, 210 are asynchronous, a transmitting device 202, 206, 210 can be replaced without impacting location accuracy. While a new transmitting device 202, 206, 210 in a synchronous location technique would need to synchronize its clock with the other devices, an asynchronous transmitting device can immediately be used to calculate a mobile device's precise location.

III. Example Use Cases

In various embodiments, the localization techniques can be used to provide a user with enough information to calculate that user's precise location (e.g., within 10-15 centimeters). By allowing the mobile device to calculate its own precise position, a user can use a location service without the fear that a company is tracking his or her location or that the location information will be leaked to unauthorized persons. In addition, these techniques can preserve the privacy of information stored on a user's device because the mobile device does not need to transmit any identifying information (e.g., unique user identifier (UUID)).

For example, in one use case, the techniques can be used to assist shoppers in finding products in a physical store. For example, transmitting devices can be located throughout the physical store. A customer use their mobile device to receive the signals from the transmitting devices and an observatory to determine a precise location in the store. This technique can employ an application (app) providing a store layout. The precise location information can be used to guide the customer to selected items located in the store.

In another use case, the techniques can be used in a large venue (e.g., an amusement park or a sports stadium). The transmitting devices can be located throughout the stadium. A user's mobile device can receive the signals from the transmitting devices and an observatory to determine a precise position within the venue. An application can be used to provide a venue layout to the user. The precise location information can be used to guide a patron to their seats or specific areas at the venue (e.g., bathrooms, concessions, etc.)

In yet another use case, the techniques can be used to determine a precise location of a mobile device for electronic payment for transportation. For example, the transmitting devices can be located in a vicinity of an entrance to a public transportation system. A mobile device can receive the signals from the transmitting devices and an observatory to determine a precise position of the mobile device to allow for contactless payment (e.g., Near Field Communication (NFC) payment).

In yet another use case, the techniques can be used to determine an estimated location in a linear queue. Transmitting devices can be positioned along a linear queue. The mobile device can receive the signals from the transmitting devices and an observatory to estimate a distance until reaching the end of the queue.

A. Two Beacons in Sequential Queue

Two transmitting devices can be used to calculate a mobile device's location along an axis running through each transmission device. Embodiments according to this disclosure can be used to track several devices position in a sequential queue, for instance the order of users in a taxi queue, or an individual's position along a straight line.

FIG. 3A illustrates an exemplary use case 300 of the time of arrival localization techniques for tracking an electronic device in a sequential queue. In various embodiments, an observatory 306 may be arranged between a first transmitting device 302 and a second transmitting device 310. FIG. 3A illustrates a first location 304 and a second location 308 along the axis 312 between the first transmitting device 302 and a second transmitting device 310.

An observatory 306 can be an electronic device that includes a receiver (e.g., a UWB receiver). In various embodiments, the observatory 306 can transmit signals and can conduct two-way communications with various devices. In various embodiments, the observatory can determine a range to each of one or more transmitting devices (e.g., the first transmitting device 302 and the second transmitting device.) In various embodiments, the observatory 306 can include a precise timing device (e.g., a GNSS based clock). In various embodiments, the observatory 306 can be powered by battery, renewal power, or a local power source.

While the transmitting devices 302, 310 can be small, low-power devices configured to broadcast signals, the observatory 306 can be connected to a power outlet and configured to both broadcast and receive signals. The transmitting devices 302, 310 may not need to be powered on at all times and may turn off to conserve battery and periodically turn on to broadcast signals. The transmitting devices 302, 310 may not record timing information and may not need accurate clocks that are precise to the nanosecond. The beacons' positons may be known and this information may be stored in a memory of the observatory 306 and sent to the electronic device or stored on a server and retrieved by the electronic device or observatory 306. The observatory 306 may only need to know the distance to each of the transmitting devices 302, 310 and this information can be entered manually into the observatory 306, the distances can also be retrieved from a database, or the observatory 306 could determine the distance though a ranging process. A ranging process may involve the transmitting devices having the capability to receive a signal from the observatory 306. An electronic device can be localized and in some instances tracked along an axis 312 that can run between the first transmitting device 302, the observatory 306, and the second transmitting device 310. The electronic device may have a precise timing device (e.g., clock) to determine the signal arrival times. The electronic device's precise timing device may be continuously running, but it also may be turned off to conserve power and turn on periodically to receive signals and record timing information.

FIG. 3B shows an exemplary graph charting an electronic device's estimated position 320 corresponding to location 1-304 shown in FIG. 3A. The y-axis is the position in meters and the x-axis is the time in seconds. The graph also depicts the first transmitting device position 322, the second transmitting device position 314, and the observatory position 316. The electronic device's actual position 318, represented by a series of dots, is also shown. The deviation between a plot of the electronic device's estimated position 320 and the actual position 318 can be due to interference, processing delays, backscatter, or other inaccuracies in the precise timing device.

FIG. 3C is illustrates an exemplary graph charting the electronic device's estimated position 328 when the device's actual position 326 corresponds to location 2-308 shown in FIG. 3A. The first transmitting device's location 332 is shown along with the observatory location 330 and the second transmitting device's position 324. As with FIG. 3B, deviation between the plot of the electronic device's estimated position 328 and the actual position 326 can be due to interference, processing delays, backscatter, or other inaccuracies in the precise timing device. Though the observatory 306 is illustrated as being located between the two transmitting devices 302, 310, other arrangements where the observatory 306 is not between the transmitting devices may be possible.

B. Sequential Update

FIG. 4A shows an embodiment of the present disclosure with one tracked device, two transmitting devices and one observatory. FIG. 4B is a timing diagram for the broadcast of signals from the transmitting devices to the observatory and the mobile device.

FIG. 4A illustrates an exemplary use case 400 of time of arrival localization using a single observatory 414, a first transmitting device 410 and a second transmitting device 406. As shown, the first transmitting device 410 transmits (broadcasts) a first signal 412 that is received by the electronic device 404 and the observatory 414. The second transmitting device 406 can also transmit a second signal 408 that is received by both the electronic device 404 and the observatory 414.

The signals 408, 412 may be broadcast at various frequencies (e.g., once a second or more frequently). The frequency of the observatory's or electronic device's clock may fluctuate over time and therefore measurements of the received transmission times for distance calculations may be the most accurate when the signals 408, 412 are received within a small time window. The observatory 414 may have a clock that is accurate to the nanosecond that precisely measures the arrival times of the signals 408, 412. In various embodiments, the arrival times of the signals 408b, 412b can be stored in a memory of the observatory 414. The observatory 414 can store the distance (range) between the observatory 414 and each of the one or more transmitting devices (e.g., the first transmitting device 410 and the second transmitting device 406). The observatory 414 can determine a precise transmission time ($t_1$) of each of the signals 408b, 412b by subtracting the difference of the range to the beacon divided by the speed of light from the arrival time ($t_2$) using the following equation:

$$t_1 = t_2 - \text{range/speed of light } (c).$$

The observatory 414 can determine the timing information for each of the transmitting devices 406, 410. The timing information can include the transmission times ($t_1$) and/or one or more reception times ($t_2$). The timing information can also include a range to the one or more of the transmitting devices 406 if electronic device 404 does not already have it. The electronic device 404 can use the transmission times ($t_1$) and/or a reception time at the electronic device 404 to calculate a range (distance) to the one or more transmitting devices 406, 410. In some embodiments, the electronic device 404 can use the range (distance) from the observatory 414 to the one or more transmitting devices 406, 410 and the one or more reception times ($t_2$) to calculate the transmission times of the one or more transmitting devices 406, 410. The clocks between the observatory 414 and the electronic device can be synchronized. The synchronization can be accomplished using a precise timing signal (e.g., a GNSS timing signal).

Periodically, the timing information from the observatory 414 may be sent to the electronic device 404. The timing information may be sent via Bluetooth, Wi-Fi, UWB, or any radio wave either directly from the observatory 414 to the electronic device 404 or indirectly through another device or over the a network (e.g., the Internet). The electronic device 404 can also have a precise clock that can be used to measure the time of arrival of signals 408a, 410a from the transmitting devices, however, the clock may not need to run continuously. The electronic device's clock may activate for short intervals in order to determine a precise device location and then turn off to conserve power. Once the electronic device 404 receives the timing information from the observatory 414, the electronic device 404 may calculate its coordinates 402 that can include the Cartesian coordinates (x, y, z, and velocities V in x, y, z directions). One way to determine the location of the electronic device 404 is to determine the ranges to each of the transmitting devices 406, 410 based on the differences in time of arrival and then use the ranges to triangulate a location. The coordinates 402 may be three-dimensional or two-dimensional and may include velocity as well as position. Alternatively, the electronic device 404 may transmit the signal timing information to the observatory 414. In various embodiments, the observatory 414 can calculate the electronic device's position and then transmit the calculated position to the electronic device 404.

FIG. 4B shows a timing chart for broadcasts from the first transmitting device 418 and the second transmitting device 420. FIG. 4B shows that the transmitting devices can transmit signals at various times, and an observatory 428 and an electronic device 430 can coordinate the timings to determine location of electronic device 430 at one or more times.

The signal reception times at the observatory 428 are shown on the left side of the graph and the signal reception times at the electronic device 430 are shown on the right side of the graph. For example, signal 422 which is transmitted from the first transmitting device 418, can reach the observatory 428 at time $t_{b-1}$. Signal 422 can be received by the electronic device 430 at time $t_{b-1}$. For example, signal 424, which is transmitted from the second transmitting device 420, can reach the observatory 428 at time $t_{y-1}$. Signal 424 can be received by the electronic device 430 at time $t_{y-1}$. Similarly, signal 426 which is transmitted from the second transmitting device 420 can reach the observatory 428 at time $t_{y-1}$. Signal 426 can be received by the electronic device 430 at time $t_{y-2}$. The signals 422, 424, 426 may not need to be sent sequentially from the transmitting devices 418, 420. Signals from one transmitting device, like signals 424 and 426, can be sent several times before a signal from a second transmitting device 420 is sent as long as one signal from each transmitting device is sent within a sufficiently small timeframe. Each of the transmitting devices 418, 420 can operate on various frequencies from each other. In some embodiments, the transmitting devices 418, 420 can operate on the same or different transmitting frequencies.

The observatory 428 can transmit information, such as the timing information described above, to the electronic device 430. The electronic device 430 can use the information to resolve which timing signal corresponds to which transmitting device 418, 420 (e.g., using a label in the transmitted information from observatory 428) for determining the location of the electronic device 430. The correspondence of time $t_{y-2}$ to time $t'_{y-2}$ can be determined as those are the two times that are closest to each other, as opposed to time $t_{y-2}$ to time $t'_{y-1}$. Either the observatory 428 or the electronic device can employ a Kalman filter to provide more accurate position measurements over time. Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe. As the reception of the radio frequency (RF) signals from the transmitting devices 418, 420 will be subject to noise, interference, and multi-path propagation of signals, Kalman filtering can be used on the received time signals.

FIG. 4B illustrates that the transmission of signals from the transmitting devices 418, 420 does not need to be periodic. In addition the signals from the transmitting devices do not need to be synchronized with each other, as the correspondence of timings can be resolved using labels (different labels for the different transmitting devices) and linking the reception times for observatory 428 and electronic device 430 by using those reception times are closest.

Figure 5:
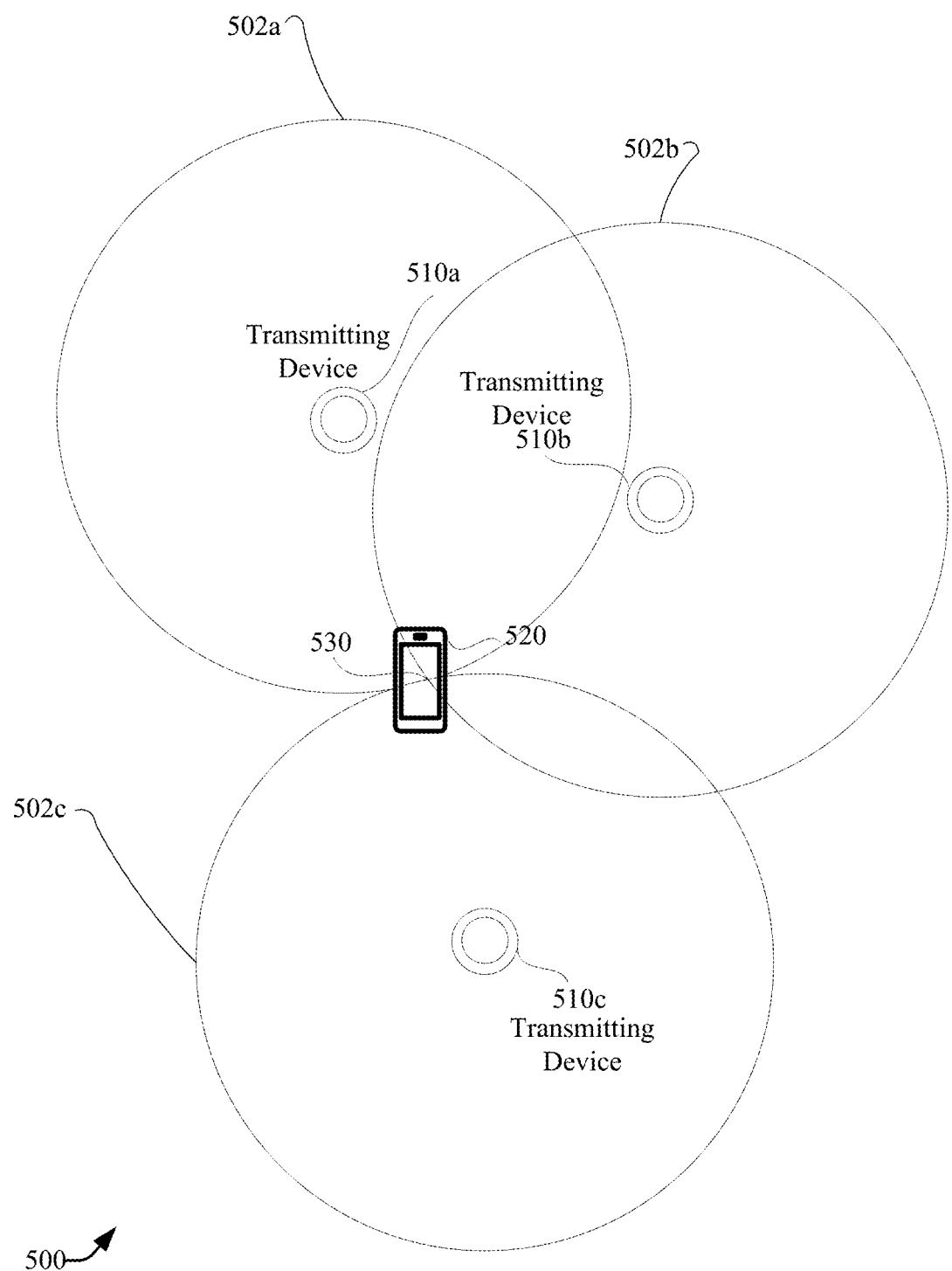
FIG. 5 illustrates an exemplary triangulation of an electronic device using three transmitting devices.

FIG. 5 illustrates triangulation technique 500 of an electronic device 520 using signals 502 sent from three transmitting devices 510a, 510b, 510c. The signals 510a, 510b, 510c may radiate omnidirectionally as shown in FIG. 5. By measuring the time difference between a transmission of each of the signals 510a, 510b, 510c and a reception time of each one of the signals 510a, 510b, 510c at an electronic device 520 can provide a range or distance from the transmitting devices 510a, 510b, 510c and the electronic device 520. The range can be illustrated as a circular range around the transmitting devices 510a, 510b, 510c and an intersection 530 of the range circles can be used to determine a precise location of the electronic device 520.

The transmitting devices 510a, 510b, 510c do not need to be synchronized for transmitting signals. The transmitting devices 510a, 510b, 510c can broadcast signals are steady or varying rates. In various embodiments, the broadcast signals can be sent approximately every 200 milliseconds. The transmitting devices 510a, 510b, 510c can be positioned in a location to optimize reception and triangulation of the signals throughout the room. For example, the location of the transmitting devices can be located on different portions of the walls, ceilings, or floors of a room.

C. Multiple Observatories for Large Venues

Figure 6:
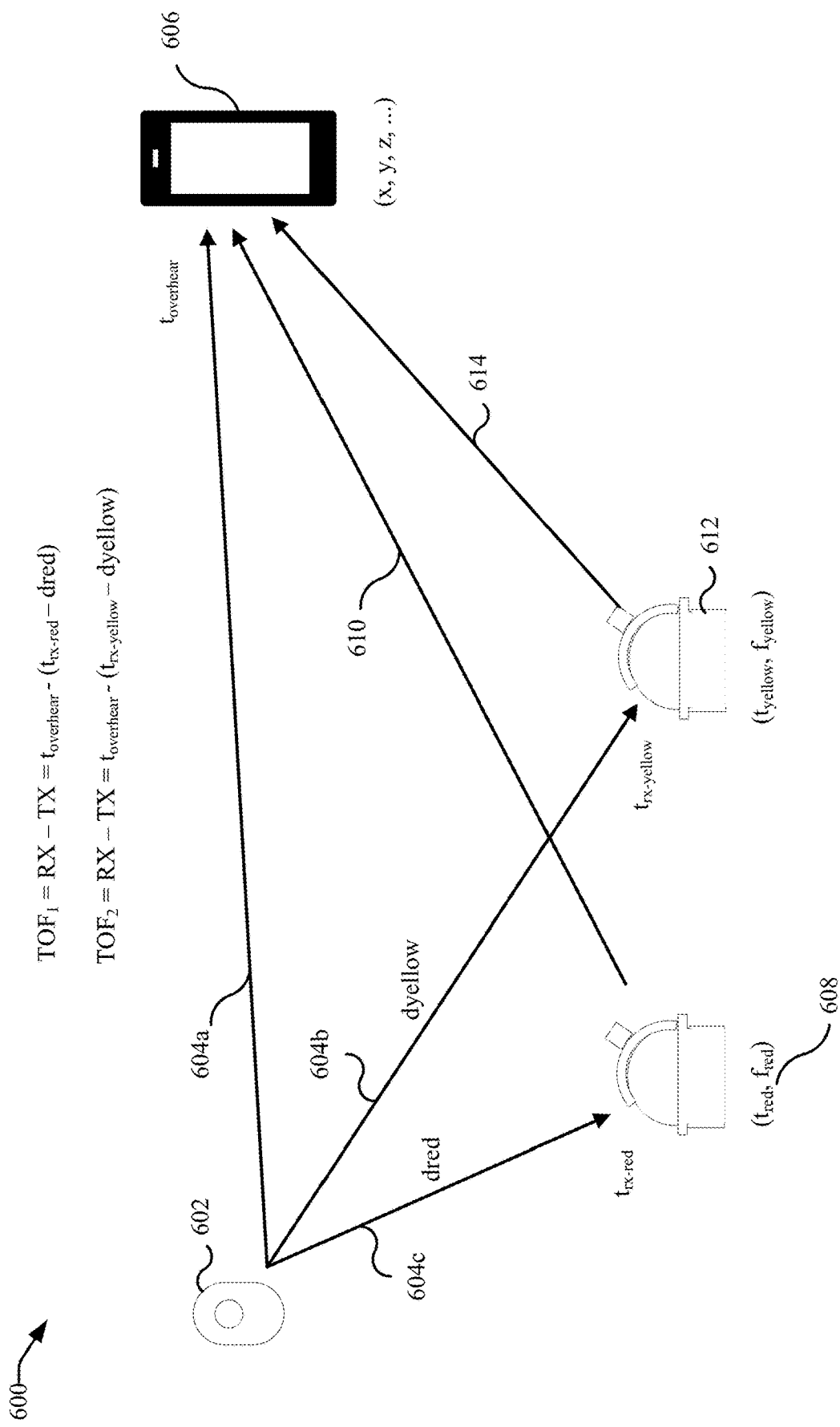
FIG. 6 illustrates an exemplary localization technique using two observatories and a single transmitting device.

FIG. 6 depicts an exemplary use case of a localization technique 600 that involves two observatories according to embodiments of the present disclosure. The technique can be used to locate an electronic device 606 in a large environment when a single observatory may not be able to receive a signal from each transmitting device (e.g., 602), and may be helpful to provide continuity in location determinations as the mobile device moves throughout the large environment. The technique can allow a seamless handoff from one observatory to another when signals from at least one transmitting device is received by both observatories.

A first observatory 608 may receive a signal 604c from a transmitting device 602. A second observatory 612 may receive a signal 604 from the same transmitting device 602. In some implementations, multiple transmitting devices may be used to calculate the electronic device's position when a signal 604a from at least one transmitting device is received by a first observatory 608 and a signal 604b from at least one transmitting device 602 is received by a second observatory 612. In this scenario, the electronic device's position may be calculated when the signal from at least one transmitting device 602 is received by both observatories 608, 612. Transmitting device 602 may send a signal 604a that is received by the electronic device 606 and the two observatories. Because the first observatory 608 and the second observatory 610 may receive a signal 604 from the same transmitting device 602 with a known location the two observatories 608, 612 can each calculate the time the signal 604 was transmitted.

When a signal is received by both observatories 608, 612 from a transmission device 602 with a known distance from each observatory, the signal is a common data point that allows the two observatory clocks to be synchronized. Each observatory can know the signal's speed, the distance between the observatory and the transmission device, and the time the signal reaches the observatory. Using this data, the time the signal was sent can be calculated for each observatory's clock by multiplying the signal's speed by the distance between the observatory and the transmission device to get the time of flight between the transmission device and the observatory. The time of flight is subtracted from the time the signal reaches the observatory to get the time the signal was sent.

When both observatories receive the same signal from the same transmission device, the calculated time that the common signal was sent is a common data point that allows the observatories' clocks to be synchronized. Such a common data point can be included in a linear system of equations that solve for the location, where the common data point allows for the measurements by both observatories to be included in the same system of equations. In some implementations, more than two observatories can be used, as long as each observatory receives a signal from a transmission device that is received by another transmission device. With both observatories' clocks synced due to the common signal 604 from the transmitting device 602, each observatory 608, 612 can send signals 610, 614 the timing information for transmitting devices received by the individual observatories. Because the clocks are synced, the timing information may be precise enough for accurate localization.

IV. Localization Flow

As described above, a mobile device and an observatory can cooperate to determine a location of the mobile device using transmission signals from beacons. The location can be determined in various ways, e.g., where the observatory stores known distance information to the beacons or where the mobile device stores this known distance information. Example techniques are described below.

A. Mobile Device

Figure 7:
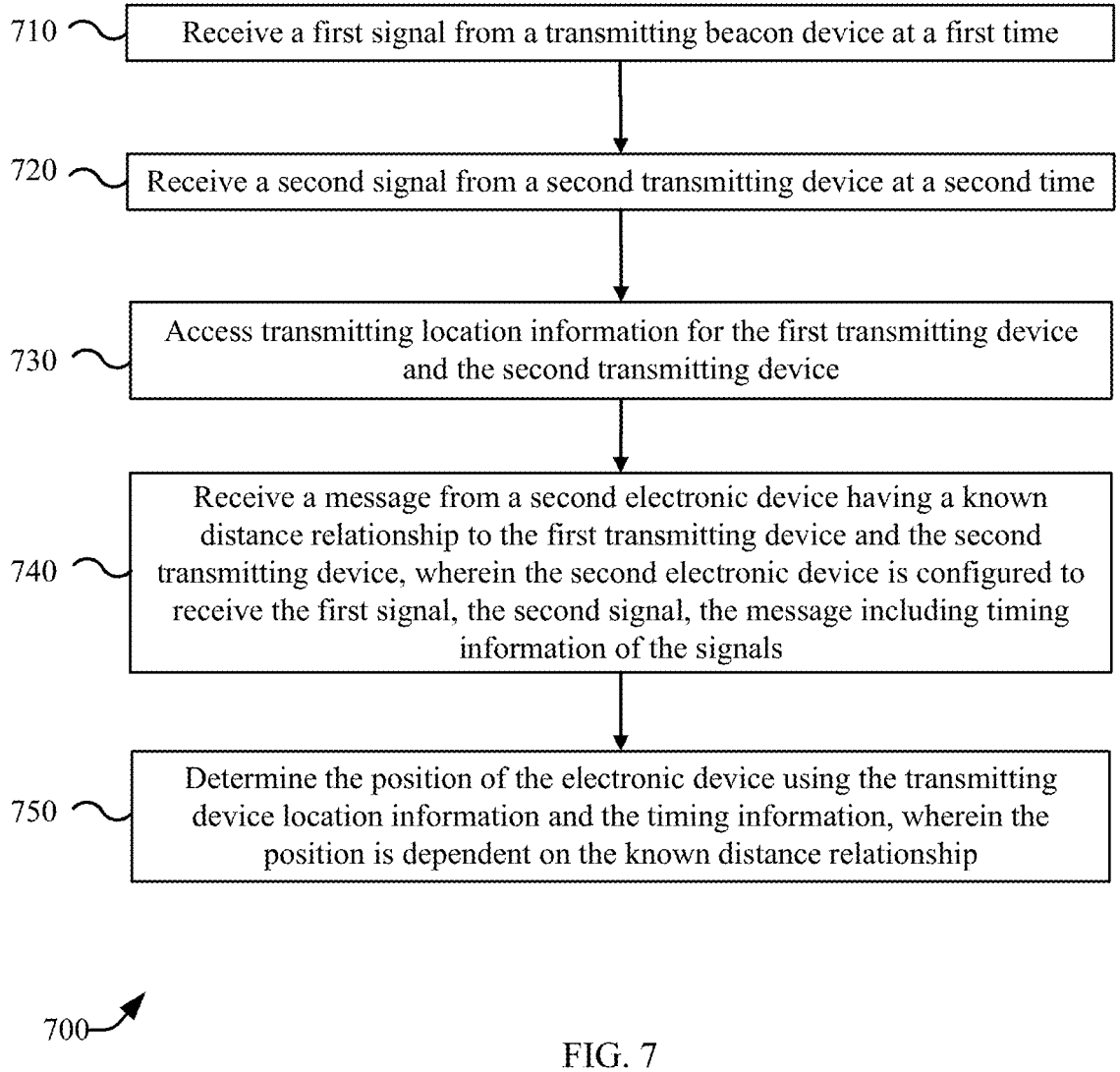
FIG. 7 illustrates an exemplary flowchart for a localization technique performed by the electronic device.

FIG. 7 is a flowchart of an example process 700 associated with techniques for localizing electronic devices performed by an electronic device (e.g., a mobile device). In some implementations, one or more process blocks of FIG. 7 may be performed by an electronic device (e.g., electronic device 1000 of FIG. 10). In some implementations, one or more process blocks of FIG. 7 may be performed by another device or a group of devices separate from or including the electronic device 1000. Additionally, or alternatively, one or more process blocks of FIG. 7 may be performed by one or more components of device 1000, such as processor 1018, computer readable medium 1002, input/output subsystem 1006, wireless circuitry 1008, GPS unit 1048, location/motion module 1026, applications 1034, and/or ranging module 1028.

At 710, a first signal is received from a first transmitting device at a first time. For example, the electronic device may receive a first signal from a first transmitting device at a first time, as described above. The first signal may be a radio frequency signal (RF) from the first transmitting device (e.g., a beacon) such as a UWB signal. The first time may be measured via a precise timing device of the electronic device. The first time can be stored in a memory of the electronic device.

At 720, a second signal is received from a second transmitting device at a second time. For example, the electronic device may receive a second signal from a second transmitting device at a second time, as described above. The second signal may be a radio frequency signal (RF) from the second transmitting device (e.g., a beacon) such as a UWB signal. The second time may be measured via a precise timing device of the electronic device. The second time can be stored in a memory of the electronic device.

At 730, location information is accessed for the first transmitting device and the second transmitting device. For example, the electronic device may access location information for the first transmitting device and the second transmitting device, as described above. The location information can be stored in a memory of the electronic device. The location information can be received by the electronic device via a network (e.g., the Internet). The location information can be received via an Application (App) being executed on the electronic device.

At 740, a message is received from a second electronic device having a known distance relationship to the first transmitting device and the second transmitting device. The second electronic device is configured to receive the first signal, the second signal, and the message including timing information of the signals as described in section II. For example, the electronic device may receive a message from a second electronic device having a known distance relationship to the first transmitting device and the second transmitting device, The second electronic device is configured to receive the first signal, the second signal, the message including timing information of the signals, as described above. The timing information of the signals can be stored in the memory of the electronic device. The timing information can be sent from the second electronic device to the electronic device via Bluetooth, Wi-Fi, UWB, or any radio wave either directly from the second electronic device to the electronic device or indirectly through another device or over the a network (e.g., the Internet).

At 750, the position of the electronic device is determined using the location information and the timing information, where the position is dependent on the known distance relationship. The position can be dependent on the known distance relationship between the transmitting devices in that the electronic device can calculate a plurality distances (ranges) from each of the transmitting devices. The known distance relationship can establish where each of the transmitting devices are in a room at a location. When the electronic devices maps each of the ranges from each of the transmitting devices it can determine a precise position in relationship to those transmitting devices. If the electronic devices knows the position of each of the transmitting devices are in a room at the location, then the mapping can establish the precise location of the electronic device in the room at the location. In various embodiments, the electronic device can receive location information on the relationship of the various transmitting devices in a location (e.g., a room). The location information can be downloaded onto the device through a network (e.g., the Internet). The location information can be provided through an application executed on the electronic device. The electronic device (e.g., mobile device) can receive the first and second signal and a receiver can store the reception time for each of the signals in a memory. In various embodiments, the timing information can include the transmission times for each one of the signals from the transmitting devices.

The electronic device can use the timing information and the reception times to determine a distance (range) from each transmitting device to the electronic device, as described herein. The distance (range) from each transmitting device to the electronic device can be used to triangulate and accurate position of the electronic device with respect to the location of the transmitting devices. The location information can be used in conjunction with the distance (range) information to determine a precise location of the electronic device at a specific location (e.g., within a room or store) by triangulating the range from each one of the transmitting devices to the electronic device.

In various embodiments, the timing information can include reception times at an observatory of the signals from the transmission devices and range information from each transmitting device and the observatory. The electronic device can use the reception times and the range information to determine the transmission times for each one of the signals. The transmission times can be used by the electronic device to determine a precise location as described above.

Process 700 may include additional implementations, such as any single implementation or any combination of implementations described below and/or in connection with one or more other processes described elsewhere herein.

As described herein, three or more transmitting device can be used. In such embodiments a third signal is received from a third transmitting device. The spatial relationship between the first, the second, and the third transmitting devices can be known by the observatory and the electronic device. The second electronic device is configured to receive the first signal, the second signal, and the third signal, the message including timing information of the signals. The third signal may be a radio frequency signal (RF) from the third transmitting device (e.g., a beacon) such as a UWB signal. The third time may be measured via a precise timing device of the electronic device. The third time can be stored in a memory of the electronic device. The timing information of the signals can be stored in the memory of the electronic device. The timing information can be sent from the second electronic device to the electronic device via Bluetooth, Wi-Fi, UWB, or any radio wave either directly from the second electronic device to the electronic device or indirectly through another device or over the a network (e.g., the Internet).

Some embodiments can use a second observatory (also referred to as the third electronic device). Thus, process 700 can include receiving a receiving a second message from a third electronic device. Such embodiments can be used in large areas in with many transmitting devices such that no second electronic device (e.g., an observatory) can be in range of all the transmitting devices. The third electronic device can receive information on a spatial relationship to at least one of the first transmitting device or the second transmitting device. The second electronic device is configured to receive at least one of the first signal or second signal from the first transmitting device and the second transmitting device respectively.

In some embodiments, the electronic device can receive a message that includes timing information of the signals. The timing information can include a transmission time of the transmitting devices. In various embodiments, the timing information can include ranges from the transmitting devices to the second electronic device. The timing information can include the reception time at the third electronic device (e.g., an observatory) of the signals from the transmitting devices. The electronic device can determine a precise position of the electronic device using the timing information received from the third electronic device and reception time information from signals from a plurality of transmitting devices, and information on a known distance relationship between the transmitting devices. The timing information of the signals can be stored in the memory of the electronic device. The timing information can be sent from the third electronic device to the electronic device or second electronic device via Bluetooth, Wi-Fi, UWB, or any radio wave either directly from the third electronic device to the first electronic device.

In some embodiments, both the second electronic device and the third electronic device receive signals from at least one common transmitting device (e.g., beacon). The signals may be radio frequency (RF) signals from the common transmitting device (e.g., a beacon) such as a UWB signal. The common signal transmission time may be measured via a precise timing device of the second electronic device or the third electronic device. The common signal time can be stored in a memory of the second electronic device or the third electronic device.

In some embodiments, the signals received by the electronic device and the second electronic device are ultra wide band signals. In some embodiments, the signals can be Bluetooth, Bluetooth Low Energy, or other RF protocols. The signals can be sent by a device configured to transmit ultra wide band signals such as the device 900 in FIG. 9.

In some embodiments, the position of the electronic device is determined without synchronizing clocks for the first transmitting device, the second transmitting device, and the electronic device. The position of the electronic device can be determined using the electronic device's processor or the location information and timing information can be sent over a network (e.g., the Internet) to a remote device with a processor that can determine the electronic device's location. After the remote device determines the electronic device's position, the position information can be sent back to the electronic device via a network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

B. Observatory

Figure 8:
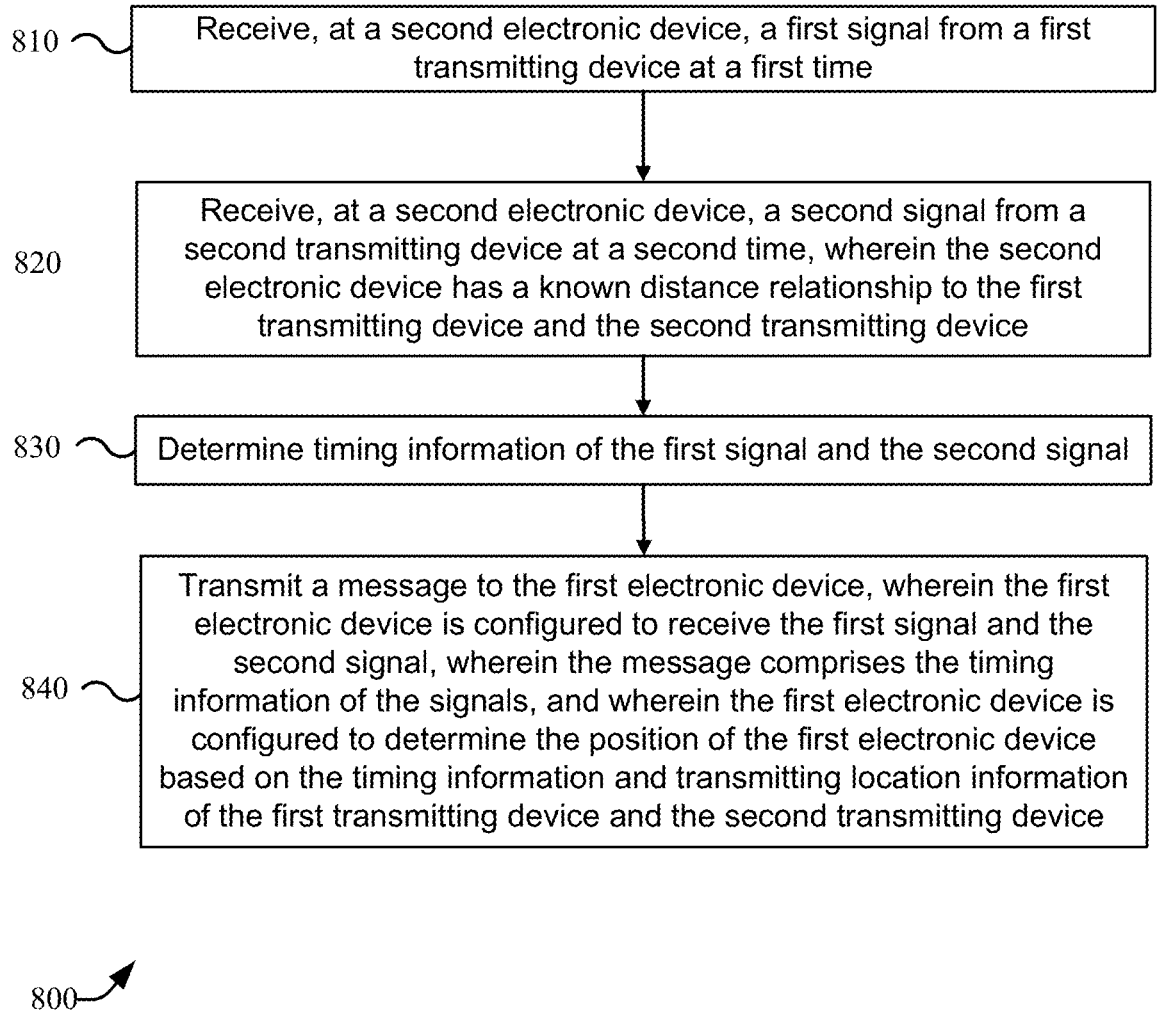
FIG. 8 illustrates an exemplary flowchart for a localization technique performed by the observatory.

FIG. 8 is a flowchart of an example process 800 associated with techniques for localizing electronic devices performed by an observatory. In some implementations, one or more process blocks of FIG. 8 may be performed by an observatory (e.g., electronic device 900 of FIG. 9). In some implementations, one or more process blocks of FIG. 8 may be performed by another device or a group of devices separate from or including the electronic device. Additionally, or alternatively, one or more process blocks of FIG. 8 may be performed by one or more components of device 1000, such as processor 1018, computer readable medium 1002, input/output subsystem 1006, wireless circuitry 1008, GPS unit 1048, location/motion module 1026, applications 1034, and/or ranging module 1028.

At 810, a first signal from a first transmitting device is received at a second electronic device at a first time. For example, the electronic device may receive, at a second electronic device, a first signal from a first transmitting device at a first time, as described above. The first signal may be a radio frequency signal (RF) from the first transmitting device (e.g., a beacon) such as a UWB signal. The first time may be measured via a precise timing device of the second electronic device. The first time can be stored in a memory of the second electronic device.

At 820, a second signal from a second transmitting device is received at a second electronic device at a second time. The second electronic device has a known distance relationship to the first transmitting device and the second transmitting device. For example, the electronic device may receive, at a second electronic device, a second signal from a second transmitting device at a second time. The second electronic device has a known distance relationship to the first transmitting device and the second transmitting device, as described above. The second signal may be a radio frequency signal (RF) from the second transmitting device (e.g., a beacon) such as a UWB signal. The second time may be measured via a precise timing device of the second electronic device. The second time can be stored in a memory of the second electronic device.

At 830, timing information of the first signal and the second signal is determined. For example, the electronic device may determine timing information of the first signal and the second signal, as described above. The timing information can be determined using the electronic device's processor or the location information and timing information can be sent over a network (e.g., the internet) to a remote device with a processor that can determine the electronic device's location. After the remote device determines the electronic device's position, the position information can be sent back to the electronic device via a network.

At 840, a message to the first electronic device is transmitted. The first electronic device is configured to receive the first signal and the second signal. The message comprises the timing information of the signals. The first electronic device is configured to determine the position of the first electronic device based on the timing information and location information of the first transmitting device and the second transmitting device. For example, the electronic device may transmit a message to the first electronic device. The first electronic device is configured to receive the first signal and the second signal. The message comprises the timing information of the signals. The first electronic device is configured to determine the position of the first electronic device based on the timing information and location information of the first transmitting device and the second transmitting device, as described above. The timing information can be stored in a memory of the first electronic device. The timing information can be received by the first electronic device via a network (e.g., the Internet). The timing information can be received via an Application (App) being executed on the first electronic device. The position of the first electronic device can be determined using the first electronic device's processor or the location information and timing information can be sent over a network (e.g., the internet) to a remote device (e.g., a server) with a processor that can determine the electronic device's location. After the remote device determines the first electronic device's position, the position information can be sent back to the electronic device via a network.

Process 800 may include additional implementations, such as any single implementation or any combination of implementations described below and/or in connection with one or more other processes described elsewhere herein.

As described herein, three or more transmitting device can be used. In such embodiments a third signal is received from a third transmitting device. The spatial relationship between the first, the second, and the third transmitting devices can be known by the observatory and the electronic device. The second electronic device is configured to receive the first signal, the second signal, and the third signal, the message including timing information of the signals. The third signal may be a radio frequency signal (RF) from the third transmitting device (e.g., a beacon) such as a UWB signal. The third time may be measured via a precise timing device of the electronic device. The third time can be stored in a memory of the electronic device. The timing information of the signals can be stored in the memory of the electronic device. The timing information can be sent from the second electronic device to the electronic device via Bluetooth, Wi-Fi, UWB, or any radio wave either directly from the second electronic device to the electronic device or indirectly through another device or over the a network (e.g., the Internet).

In some embodiments, process 700 includes receiving a receiving a second message from a third electronic device (e.g., a second observatory). The second implementation can be used in large areas in with many transmitting devices such that no second electronic device (e.g., an observatory) can be in range of all the transmitting devices. The third electronic device can receive information on a spatial relationship to at least one of the first transmitting device or the second transmitting device. The second electronic device is configured to receive at least one of the first signal or second signal from the first transmitting device and the second transmitting device respectively.

The electronic device can receive a message that includes timing information of the signals. The timing information can include a transmission time of the transmitting devices. In various embodiments, the timing information can include ranges from the transmitting devices to the second electronic device. The timing information can include the reception time at the third electronic device (e.g., an observatory) of the signals from the transmitting devices. The electronic device can determine a precise position of the electronic device using the timing information received from the third electronic device and reception time information from signals from a plurality of transmitting devices, and information on a known distance relationship between the transmitting devices. The timing information of the signals can be stored in the memory of the electronic device. The timing information can be sent from the third electronic device to the electronic device or second electronic device via Bluetooth, Wi-Fi, UWB, or any radio wave either directly from the third electronic device to the first electronic device.

In some embodiments, both the second electronic device and the third electronic device receive signals from at least one common transmitting device (e.g., beacon). The signals may be radio frequency (RF) signals from the common transmitting device (e.g., a beacon) such as a UWB signal. The common signal transmission time may be measured via a precise timing device of the second electronic device or the third electronic device. The common signal time can be stored in a memory of the second electronic device or the third electronic device.

In some embodiments, the signals received by the electronic device and the second electronic device are ultra wide band signals. The signals can be sent by a device configured to transmit ultra wide band signals such as the device 900 in FIG. 9.

In some embodiments, the position of the electronic device is determined without synchronizing clocks for the first transmitting device, the second transmitting device, and the electronic device. The position of the electronic device can be determined using the electronic device's processor or the location information and timing information can be sent over a network (e.g., the Internet) to a remote device with a processor that can determine the electronic device's location. After the remote device determines the electronic device's position, the position information can be sent back to the electronic device via a network.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

V. Electronic Device for Performing Communications

Figure 9:
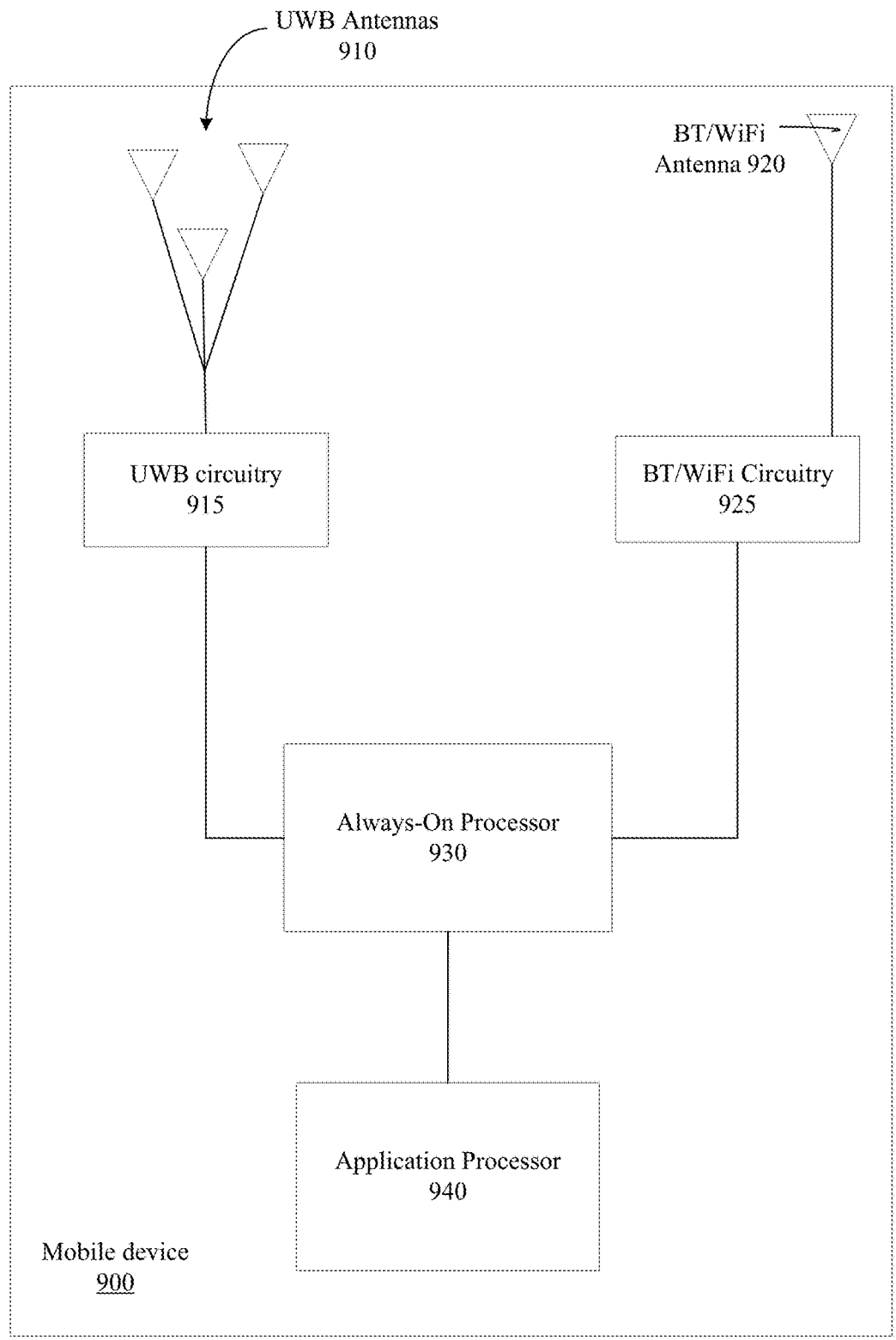
FIG. 9 is a block diagram of components of an electronic device operable to perform ranging according to embodiments of the present disclosure.

FIG. 9 is a block diagram of components of a mobile device 900 operable to perform passive beacon communication techniques according to embodiments of the present disclosure. Mobile device 900 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 900 includes UWB antennas 910 for performing ranging. UWB antennas 910 are connected to UWB circuitry 915 for analyzing detected signals from UWB antennas 910. In some embodiments, mobile device 900 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 915 can communicate with an always-on processor (AOP) 930, which can perform further processing using information from UWB messages. For example, AOP 930 can perform the ranging calculations using timing data provided by UWB circuitry 915. AOP 930 and other circuits of the device can include dedicated circuitry and/or configurable circuitry, e.g., via firmware or other software.

As shown, mobile device 900 also includes Bluetooth (BT)/Wi-Fi antenna 920 for communicating data with other devices. Bluetooth (BT)/Wi-Fi antenna 920 is connected to BT/Wi-Fi circuitry 925 for analyzing detected signals from BT/Wi-Fi antenna 920. For example, BT/Wi-Fi circuitry 925 can parse messages to obtain data (e.g., an authentication tag), which can be sent on to AOP 930. In some embodiments, AOP 930 can perform authentication using an authentication tag. Thus, AOP 930 can store or retrieve a list of authentication tags for which to compare a received tag against, as part of an authentication process. In some implementations, such functionality could be achieved by BT/Wi-Fi circuitry 925.

In other embodiments, UWB circuitry 915 and BT/Wi-Fi circuitry 925 can alternatively or in addition be connected to application processor 940, which can perform similar functionality as AOP 930. Application processor 940 typically requires more power than AOP 930, and thus power can be saved by AOP 930 handling certain functionality, so that application processor 940 can remain in a sleep state, e.g., an off state. As an example, application processor 940 can be used for communicating audio or video using BT/Wi-Fi, while AOP 930 can coordinate transmission of such content and communication between UWB circuitry 915 and BT/Wi-Fi circuitry 925. For instance, AOP 930 can coordinate timing of UWB messages relative to BT advertisements.

Coordination by AOP 930 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 930. In addition, it is not desirable to wake up the application processor of every other device in the room, and thus the AOPs of the other devices can perform some processing of the messages and determine that the destination address is for a different device.

To perform ranging, BT/Wi-Fi circuitry 925 can analyze an advertisement signal from another device to determine that the other device wants to perform ranging, e.g., as part of a process for sharing content. BT/Wi-Fi circuitry 925 can communicate this notification to AOP 930, which can schedule UWB circuitry 915 to be ready to detect UWB messages from the other device.

For the device initiating ranging, its AOP can perform the ranging calculations. Further, the AOP can monitor changes in distance between the other devices. For example, AOP 930 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VI. Example Electronic Device

Figure 10:
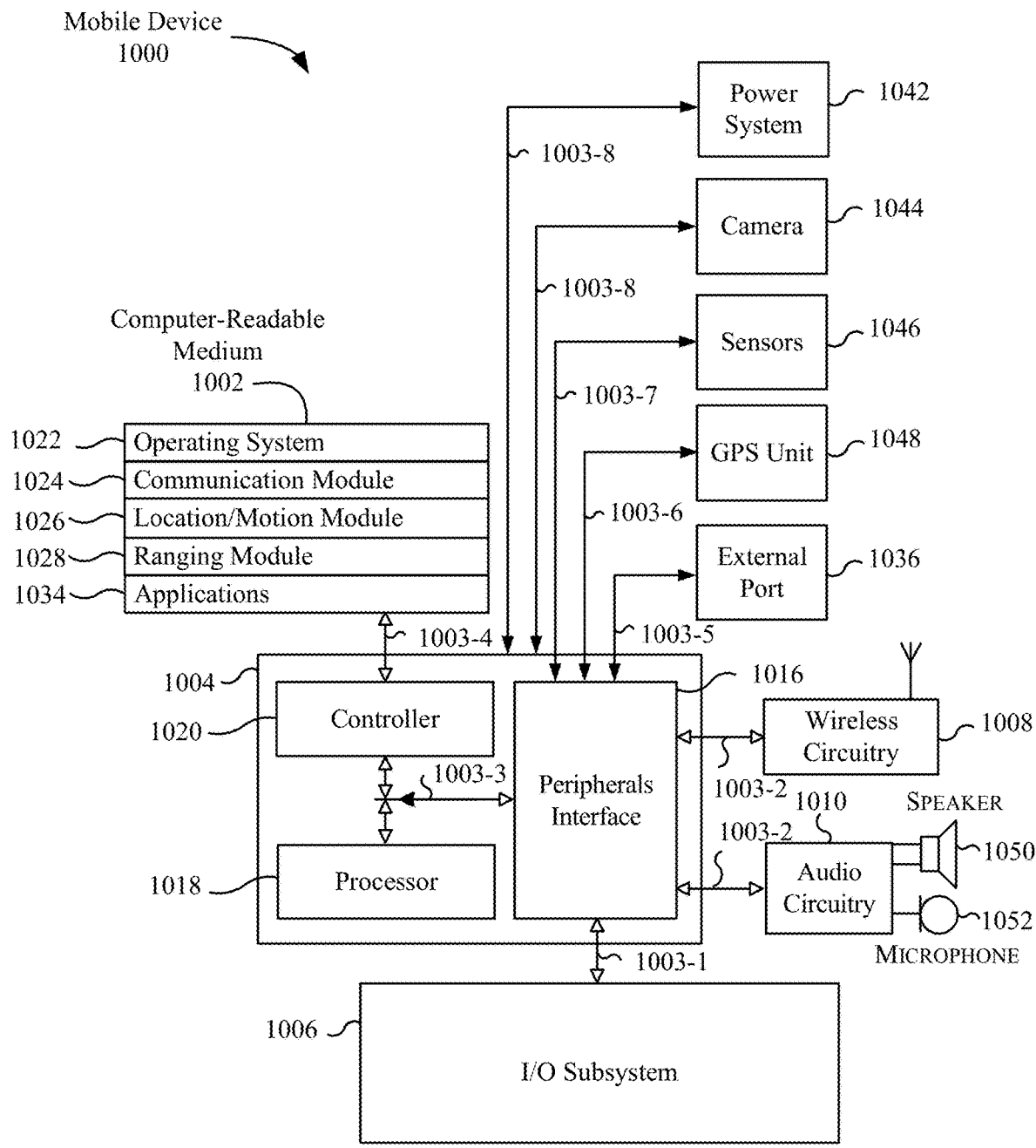
FIG. 10 is block diagram of an example device according to embodiments of the present disclosure.

FIG. 10 is a block diagram of an example electronic device 1000. Device 1000 generally includes computer-readable medium 1002, control circuitry 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1008 can use various protocols, e.g., as described herein. In various embodiments, wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1008 is coupled to control circuitry 1004 via peripherals interface 1016. Peripherals interface 1016 can include conventional components for establishing and maintaining communication between peripherals and. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of device 1000 to the one or more processors 1018 and computer-readable medium 1002. One or more processors 1018 communicate with computer-readable medium 1002 via a controller 1020. Computer-readable medium 1002 can be any device or medium that can store code and/or data for use by one or more processors 1018. Computer-readable medium 1002 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 1016, one or more processors 1018, and controller 1020 can be implemented on a single chip, such as control circuitry 1004. In some other embodiments, they can be implemented on separate chips.

Processor(s) 1018 can include hardware and/or software elements that perform one or more processing functions, such as mathematical operations, logical operations, data manipulation operations, data transfer operations, controlling the reception of user input, controlling output of information to users, or the like. Processor(s) 1018 can be embodied as one or more hardware processors, microprocessors, microcontrollers; field programmable gate arrays (FPGAs), application-specified integrated circuits (ASICs), or the like.

Device 1000 may include storage and processing circuitry such as control circuitry 1004. Control circuitry 1004 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1004 may be used to control the operation of device

1000. This processing circuitry may be based on one or more microprocessors, microcontrollers, digital signal processors, baseband processor integrated circuits, application specific integrated circuits, etc.

Control circuitry 1004 may be used to run software on device 1000, such as internet browsing applications, voice-over-internet-protocol (VOIP) telephone call applications, email applications, media playback applications, operating system functions, etc. To support interactions with external equipment, control circuitry 1004 may be used in implementing communications protocols. Communications protocols that may be implemented using control circuitry 1004 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1000 may include input/output subsystem 1006. Input/output subsystem 1006 may include input-output devices. Input/output devices may be used to allow data to be supplied to device 1000 and to allow data to be provided from device 1000 to external devices. Input/output devices may include user interface devices, data port devices, and other input-output components. For example, input/output devices may include one or more displays (e.g., touch screens or displays without touch sensor capabilities), one or more image sensors 1044 (e.g., digital image sensors), motion sensors, and speakers 1050. Input-output device may also include buttons, joysticks, scrolling wheels, touch pads, key pads, keyboards, microphones 1052, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes an image sensor 1044 (e.g., a camera). In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, device 1000 can include a Global Positioning System (GPS) receiver, sometimes referred to as a GPS unit 1048. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module 1024 (or set of instructions), a location module 1026 (or set of instructions), a ranging module 1028 that is used as part of ranging operation described herein, and other application programs 1034 (or set of instructions).

Operating system 1022 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

Ranging module 1028 can send/receive ranging messages to/from an antenna, e.g., connected to wireless circuitry 1008. The messages can be used for various purposes, e.g., to identify a sending antenna of a device, determine timestamps of messages to determine a distance of mobile device 1000 from another device. Ranging module 1028 can exist on various processors of the device, e.g., an always-on processor (AOP), a UWB chip, and/or an application processor. For example, parts of ranging module 1028 can determine a distance on an AOP, and another part of the ranging module can interact with a sharing module, e.g., to display a position of the other device on a screen in order for a user to select the other device to share a data item. Ranging module 1028 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1000 (e.g., portions of the display cover layer, portions of a plastic antenna window in a metal housing sidewall portion of housing, etc.). With one illustrative configuration, some or all of rear face of device 1000 may be formed from a dielectric. For example, the rear wall of housing may be formed from glass plastic, ceramic, other dielectric. In this type of arrangement, antennas may be mounted within the interior of device 1000 in a location that allows the antennas to transmit and receive antenna signals through the rear wall of device 1000 (and, if desired, through optional dielectric sidewall portions in housing). Antennas may also be formed from metal sidewall structures in housing and may be located in peripheral portions of device 1000.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 1000 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1000 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1000. As an example, antennas may be mounted at one or both ends of device 1000 (e.g., along the upper and lower edges of housing, at the corners of housing, etc.).

Antennas in device 1000 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1000 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1044 may include one or more visible digital image sensors (visible-light cameras) and/or one or more infrared digital image sensors (infrared-light cameras). Image sensors 1044 may, if desired, be used to measure distances. For example, an infrared time-of-flight image sensor may be used to measure the time that it takes for an infrared light pulse to reflect back from objects in the vicinity of device 1000, which may in turn be used to determine the distance to those objects. Visible imaging systems such as a front and/or rear-facing camera in device 1000 may also be used to determine the position of objects in the environment. For example, control circuitry 1004 may use image sensors 1044 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1004 may rely entirely upon image sensors 1044 to perform simultaneous localization and mapping, or control circuitry 1004 may synthesize image data with range data from one or more distance sensors (e.g., light-based proximity sensors). If desired, control circuitry 1004 may use display to display a visual representation of the mapped environment.

Input-output devices may include motion sensor circuitry 1046. Motion sensor circuitry 1046 may include one or more accelerometers (e.g., accelerometers that measure acceleration along one, two, or three axes), gyroscopes, barometers, magnetic sensors (e.g., compasses), image sensors (e.g., image sensor 1044) and other sensor structures. Sensors 1046 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1004 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1004. Movement generation circuitry may include electromechanical actuator circuitry that, when driven, moves device 1000 in one or more directions. For example, movement generation circuitry may laterally move device 1000 and/or may rotate device 1000 around one or more axes of rotation. Movement generation circuitry may, for example, include one or more actuators formed at one or more locations of device 1000. When driven by a motion control signal, actuators may move (e.g., vibrate, pulse, tilt, push, pull, rotate, etc.) to cause device 1000 to move or rotate in one or more directions. The movement may be slight (e.g., not noticeable or barely noticeable to a user of device 1000), or the movement may be substantial. Actuators may be based on one or more vibrators, motors, solenoids, piezoelectric actuators, speaker coils, or any other desired device capable of mechanically (physically) moving device 1000.

Some or all of movement generation circuitry such as actuators may be used to perform operations that are unrelated to rotation of device 1000. For example, actuators may include vibrators that are actuated to issue a haptic alert or notification to a user of device 1000. Such alerts may include, for example, a received text message alert identifying that device 1000 has received a text message, a received telephone call alert, a received email alert, an alarm notification alert, a calendar notification alert, or any other desired notification. By actuating actuator, device 1000 may inform the user of any desired device condition.

Motion sensor circuitry may sense motion of device 1000 that is generated by movement generation circuitry. If desired, motion sensor circuitry may provide feedback signals associated with the sensed motion of device 1000 to movement generation circuitry. Movement generation circuitry may use the feedback signals to control actuation of the movement generation circuitry.

Control circuitry 1004 may use motion sensor circuitry and/or movement generation circuitry to determine the angle of arrival of wireless signals received by device 1000 from another electronic device. For example, control circuitry 1004 may use movement generation circuitry to move device 1000 from one position to another. Motion sensor circuitry may be used to track the movement of device 1000 as it is moved between the different positions. At each position, control circuitry 1004 may receive wireless signals from another electronic device. Control circuitry 1004 may process the received wireless signals together with the motion data from motion sensor circuitry to more accurately determine the position of the other electronic device. The use of motion generation circuitry is merely illustrative, however. If desired, motion sensor circuitry may track movement of device 1000 that is not caused by motion generation circuitry. This may include a user's natural, unprompted movement of device 1000 and/or the user's movement of device 1000 after the user is prompted (by display, audio circuitry 1010, a haptic output device in device 1000, or any other suitable output device) to move device 1000 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1008 may include radio-frequency transceiver circuitry for handling various radio-frequency communications bands. For example, wireless circuitry 1008 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1000 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1034 on device 1000 can include any applications installed on the device 1000, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or trackpad. In some embodiments, I/O subsystem 1006 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device 1000 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmitting devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmitting devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method for determining a position of a first electronic device, the method comprising:
   downloading location information for one or more transmitting devices and a second electronic device;
   receiving a first signal from a first transmitting device of the one or more transmitting devices at a first time;
   receiving a second signal from a second transmitting device of the one or more transmitting devices at a second time;
   accessing the downloaded location information to identify a first position for the first transmitting device and a second position for the second transmitting device;
   receiving a message from the second electronic device having a known distance relationship to the first position of the first transmitting device and the second position of the second transmitting device, wherein the second electronic device is configured to receive the first signal, the second signal, the message including first signal timing information of the first signal and the second signal, wherein the first signal timing information comprises a first transmission time for the first signal and a second transmission time for the second signal; and
   determining the position of the first electronic device using the first position and the second position identified from the downloaded location information and the first signal timing information, wherein the position is dependent on the known distance relationship.

2. The method of claim 1, further comprising:
   receiving a third signal from a third transmitting device; and
   accessing the downloaded location information to identify a third position for the third transmitting device, wherein the second electronic device has a known spatial relationship to the third transmitting device, wherein the second electronic device is configured to receive the third signal, and wherein the first timing information includes timing information of the third signal.

3. The method of claim 1, further comprising:
receiving a second message from a third electronic device having a second known distance relationship to the first transmitting device and the second transmitting device, wherein the third electronic device is configured to receive the first signal and the second signal, the second message including second signal timing information of the first signal and the second signal; and
determining the position of the first electronic device using the downloaded location information and the second signal timing information.

4. The method of claim 3, wherein both the second electronic device and the third electronic device receive signals from at least one common transmitting device.

5. The method of claim 1, wherein the first signal and the second signal received by the first electronic device and the second electronic device are ultra wide band signals.

6. The method of claim 1, wherein the position of the first electronic device is determined without synchronizing clocks for the first transmitting device, the second transmitting device, and the second electronic device.

7. The method of claim 1, wherein the first signal timing information comprises reception time information of a plurality of signals at the second electronic device and ranges between the second electronic device and a plurality of transmitting devices.

8. A method for facilitating a determination of a position of a first electronic device, the method comprising performing at a second electronic device:
downloading location information for one or more transmitting devices and a second electronic device;
receiving a first signal from a first transmitting device of the one or more transmitting devices at a first time;
receiving a second signal from a second transmitting device of the one or more transmitting devices at a second time, wherein the second electronic device has a known distance relationship to the first transmitting device and the second transmitting device;
accessing the downloaded location information to identify a first position for the first transmitting device and a second position for the second transmitting device;
determining first signal timing information of the first signal and the second signal using the first position and the second position; and
transmitting a first message to the first electronic device, wherein the first electronic device is configured to receive the first signal and the second signal, wherein the first message comprises the first signal timing information of the first signal and the second signal, wherein the first signal timing information comprises a first transmission time for the first signal and a second transmission time for the second signal, and wherein the first electronic device is configured to determine the position of the first electronic device based on the first signal timing information and the first position and the second position identified from the downloaded location information of the first transmitting device and the second transmitting device.

9. The method of claim 8, further comprising:
receiving a third signal from a third transmitting device at the second electronic device;

accessing the downloaded location information to identify a third position for the third transmitting device;
determining second signal timing information of the first signal, the second signal, and the third signal, wherein the second signal timing information comprises the first transmission time of the first signal, the second transmission time of the second signal, and a third transmission time of the third signal; and
transmitting a second message to the first electronic device wherein the first electronic device is configured to receive the first signal, the second signal, and the third signal, wherein the second message comprises the second signal timing information of the first signal, the second signal, and the third signal; wherein the second signal timing information comprises the first transmission time for the first signal and the second transmission time for the second signal, and a third transmission time for the third signal; and wherein the first electronic device is configured to determine the position of the first electronic device based at least in part on the second signal timing information and the first position, the second position, and the third position identified from the downloaded location information.

10. The method of claim 8, further comprising:
receiving a second message from a third electronic device having a second known distance relationship to the first transmitting device and the second transmitting device, wherein the third third electronic device is configured to receive the first signal and the second signal, the second message including second signal timing information of the first signal and the second signal; and
determining the position of the second electronic device using the downloaded location information and the second signal timing information.

11. The method of claim 10, wherein both the second electronic device and the third electronic device receive signals from at least one common transmitting device.

12. The method of claim 8, wherein, the first signal and the second signal received by the first electronic device and the second electronic device are ultra wide band signals.

13. The method of claim 8, wherein the position of the first electronic device is determined without synchronizing clocks for the first transmitting device, the second transmitting device, and the first electronic device.

14. The method of claim 8, wherein the first signal timing information comprises reception time information of a plurality of signals at the second electronic device and ranges between the second electronic device and a plurality of transmitting devices.

15. A computing device, comprising:
one or more memories; and
one or more processors in communication with the one or more memories and configured to execute instructions stored in the one or more memories to performing operations for facilitating a determination of a position of a first electronic device, the operations comprising:
downloading location information for one or more transmitting devices and a second electronic device;
receiving a first signal from a first transmitting device of the one or more transmitting devices at a first time;
receiving a second signal from a second transmitting device of the one or more transmitting devices at a second time;
accessing the downloaded location information to identify a first position for the first transmitting device and a second position for the second transmitting device;

receiving a message from the second electronic device having a known distance relationship to the first position of the first transmitting device and the second position of the second transmitting device, wherein the second electronic device is configured to receive the first signal, and the second signal, the message including first signal timing information of the first signal and the second signal, wherein the first signal timing information comprises a first transmission time for the first signal and a second transmission time for the second signal; and determining a position of the first electronic device using the first position and the second position identified from the downloaded location information and the first signal timing information, wherein the position is dependent on the known distance relationship.

16. The computing device of claim 15, the operations further comprising:

receiving a third signal from a third transmitting device; and accessing the downloaded location information to identify a third position for the third transmitting device, wherein the second electronic device has a known spatial relationship to the third transmitting device, wherein the second electronic device is configured to receive the third signal, and wherein the first signal timing information includes timing information of the third signal.

17. The computing device of claim 15, the operations further comprising:

receiving a second message from a third electronic device having a second known distance relationship to at least one of the first transmitting device and the second transmitting device, wherein the third electronic device is configured to receive the first signal and the second signal, the second message including second signal timing information of the first signal and the second signal; and determining the position of the first electronic device using the downloaded location information and the second signal timing information.

18. The computing device of claim 17, wherein both the second electronic device and the third electronic device receive signals from at least one common transmitting device.

* * * * *